(12) United States Patent
Hong et al.

(10) Patent No.: US 7,857,885 B2
(45) Date of Patent: *Dec. 28, 2010

(54) FILTER

(75) Inventors: Sungtae Hong, Gifu (JP); Teruo Komori, Gifu (JP); Kazushige Ohno, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 303 days.

This patent is subject to a terminal disclaimer.

(21) Appl. No.: 11/760,833

(22) Filed: Jun. 11, 2007

(65) Prior Publication Data

US 2007/0227109 A1 Oct. 4, 2007

Related U.S. Application Data

(63) Continuation of application No. 10/490,206, filed on Sep. 2, 2004, now Pat. No. 7,326,270.

(51) Int. Cl.
*B01D 39/20* (2006.01)
*F01N 3/02* (2006.01)

(52) U.S. Cl. .......................... 55/523; 55/529

(58) Field of Classification Search .............. 55/523, 55/529, DIG. 30; 428/116–118; 60/297, 60/311
See application file for complete search history.

(56) References Cited

U.S. PATENT DOCUMENTS

| | | | |
|---|---|---|---|
| 4,276,071 A | 6/1981 | Outland |
| 4,335,023 A | 6/1982 | Dettling et al. |
| 4,364,761 A | 12/1982 | Berg et al. |
| 4,416,676 A | 11/1983 | Montierth |
| 4,417,908 A | 11/1983 | Pitcher, Jr. |
| 4,420,316 A | 12/1983 | Frost et al. |
| 4,643,749 A | 2/1987 | Miura |
| 4,857,089 A | 8/1989 | Kitagawa et al. |

(Continued)

FOREIGN PATENT DOCUMENTS

AR  7-163823  6/1995

(Continued)

OTHER PUBLICATIONS

U.S. Appl. No. 10/502,054, filed Sep. 2, 2004, Taoka, et al.

*Primary Examiner*—Frank M Lawrence
(74) *Attorney, Agent, or Firm*—Oblon, Spivak, McClelland, Maier & Neustadt, L.L.P.

(57) ABSTRACT

A column shaped filter having a honeycomb structure including a number of through holes extending parallel with one another in the length direction with wall portion interposed therebetween. The through holes are constituted by large-capacity through holes having a relatively larger cross-sectional area in the cross section perpendicular to the length direction and small-capacity through holes having a relatively smaller cross-sectional area in the cross section. The numbers of the two types of through holes are substantially set to the same. The large-capacity through holes are sealed at one end of the filter, while the small-capacity through holes are sealed at the other end of the filter. The large-capacity and small-capacity through holes have a ratio of partition wall length, α, and an aperture ratio, β, and α and β satisfy $\beta \geq (20/9)\alpha^2 + 1$ (where $0 < \alpha \leq 1.5$ and $1 < \beta \leq 6$).

25 Claims, 20 Drawing Sheets

U.S. PATENT DOCUMENTS

| | | |
|---|---|---|
| 5,194,414 A | 3/1993 | Kuma |
| 5,545,243 A | 8/1996 | Kotani et al. |
| 5,914,187 A | 6/1999 | Naruse et al. |
| 5,930,994 A | 8/1999 | Shimato et al. |
| 6,395,370 B1 | 5/2002 | Noda et al. |
| 6,447,564 B1 | 9/2002 | Ohno et al. |
| 6,565,630 B2 | 5/2003 | Ohno et al. |
| 6,656,564 B2 | 12/2003 | Ichikawa et al. |
| 6,669,751 B1 | 12/2003 | Ohno et al. |
| 6,770,116 B2 | 8/2004 | Kojima |
| 6,939,825 B1 | 9/2005 | Ohno et al. |
| 7,112,233 B2 | 9/2006 | Ohno et al. |
| 7,119,046 B2 | 10/2006 | Ohno et al. |
| 7,196,037 B2 | 3/2007 | Ohno et al. |
| 7,234,296 B2 | 6/2007 | Kojima |
| 7,250,385 B1 | 7/2007 | Ohno et al. |
| 7,326,270 B2 | 2/2008 | Hong et al. |
| 2003/0041730 A1 | 3/2003 | Beall et al. |
| 2003/0167755 A1 | 9/2003 | Nakatani et al. |
| 2004/0033175 A1 | 2/2004 | Ohno et al. |
| 2004/0097370 A1 | 5/2004 | Ichikawa et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0076626 A1 | 4/2005 | Kudo et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0235621 A1 | 10/2005 | Kunieda et al. |
| 2005/0247038 A1 | 11/2005 | Takahashi |
| 2005/0266991 A1 | 12/2005 | Ohno et al. |
| 2005/0272602 A1 | 12/2005 | Ninomiya |
| 2006/0019061 A1 | 1/2006 | Oshimi |
| 2006/0029897 A1 | 2/2006 | Saijo et al. |
| 2006/0029898 A1 | 2/2006 | Saijo et al. |
| 2006/0032203 A1 | 2/2006 | Komori et al. |
| 2006/0043652 A1 | 3/2006 | Saijo et al. |
| 2006/0059877 A1 | 3/2006 | Yoshida |
| 2006/0068159 A1 | 3/2006 | Komori et al. |
| 2006/0073970 A1 | 4/2006 | Yamada |
| 2006/0075731 A1 | 4/2006 | Ohno et al. |
| 2006/0093784 A1 | 5/2006 | Komori et al. |
| 2006/0154021 A1 | 7/2006 | Ohno et al. |
| 2006/0159602 A1 | 7/2006 | Ohno et al. |
| 2006/0166820 A1 | 7/2006 | Ogyu et al. |
| 2006/0213163 A1 | 9/2006 | Taoka et al. |
| 2006/0269722 A1 | 11/2006 | Yamada |
| 2007/0126160 A1 | 6/2007 | Takahashi |
| 2007/0202455 A1 | 8/2007 | Saijo et al. |
| 2008/0085394 A1 | 4/2008 | Ohno et al. |
| 2008/0086993 A1 | 4/2008 | Komori et al. |
| 2008/0261806 A1 | 10/2008 | Konstandopoulos et al. |

FOREIGN PATENT DOCUMENTS

| | | |
|---|---|---|
| DE | 100 37 403 A1 | 2/2002 |
| EP | 0 089 751 | 9/1983 |
| EP | 0 277 012 A1 | 8/1988 |
| EP | 0 283 220 A1 | 9/1988 |
| EP | 0 658 363 A1 | 6/1995 |
| EP | 1 125 704 A1 | 8/2001 |
| EP | 1 142 619 A1 | 10/2001 |
| EP | 1 170 270 A1 | 1/2002 |
| EP | 1 174 399 A1 | 1/2002 |
| EP | 1 447 535 A1 | 8/2004 |
| FR | 2 789 327 | 8/2000 |
| FR | 2840545 | 12/2003 |
| JP | 56-124417 | 9/1981 |
| JP | 56-124418 | 9/1981 |
| JP | 58-92409 | 6/1983 |
| JP | 58-150015 | 9/1983 |
| JP | 58-196820 | 11/1983 |
| JP | 61-424 | 1/1986 |
| JP | 62-96717 | 5/1987 |
| JP | 62-225249 | 10/1987 |
| JP | 63-185425 | 8/1988 |
| JP | 63-224740 | 9/1988 |
| JP | 3-121213 | 5/1991 |
| JP | 3-49608 | 7/1991 |
| JP | 3-102016 | 10/1991 |
| JP | 5-68828 | 3/1993 |
| JP | 6-47620 | 6/1994 |
| JP | 2000-279729 | 10/2000 |
| JP | 3130587 | 11/2000 |
| JP | 2001-96117 | 4/2001 |
| JP | 2001-162121 | 6/2001 |
| JP | 2001-199777 | 7/2001 |
| JP | 2001-206780 | 7/2001 |
| JP | 2001-206870 | 7/2001 |
| JP | 2001-334114 | 12/2001 |
| JP | 2003-1029 | 1/2003 |
| JP | 2003-49627 | 2/2003 |
| JP | 2003-155908 | 5/2003 |
| JP | 2004-896 | 1/2004 |
| WO | WO 01/15877 A1 | 3/2001 |
| WO | WO 01/23069 A1 | 4/2001 |
| WO | WO 01/53232 A1 | 7/2001 |
| WO | 02/10562 | 2/2002 |
| WO | WO 02/10562 | 2/2002 |
| WO | 02/100514 | 12/2002 |
| WO | WO 03/014539 A1 | 2/2003 |
| WO | 03/020407 | 3/2003 |
| WO | WO 03/044338 A1 | 5/2003 |
| WO | 03/080218 | 10/2003 |

Cross-sectional view taken along line A-A (a)

(b)

(c)

(d)

(e)

PRIOR ART

Fig. 9
PRIOR ART
(a)
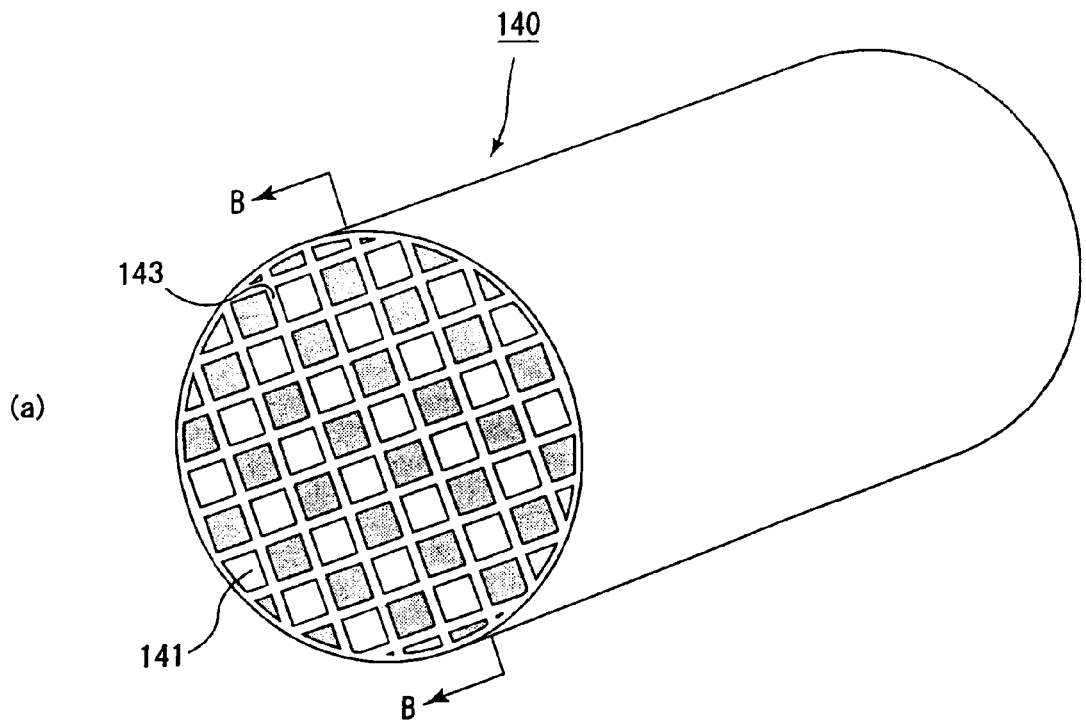
(b)
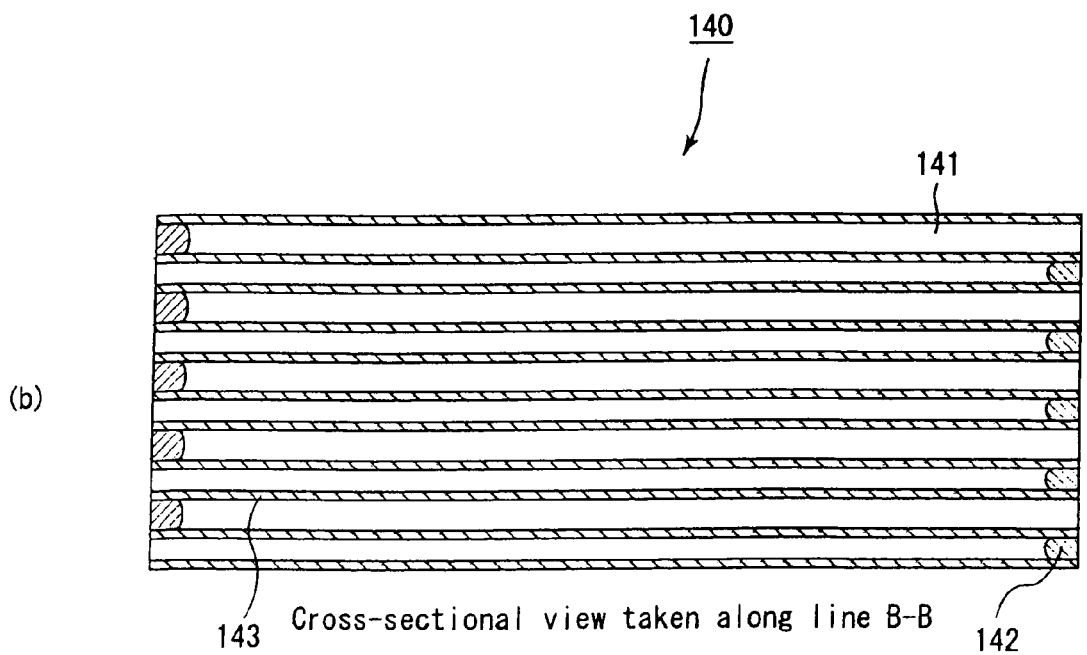
Cross-sectional view taken along line B-B

FILTER

CROSS REFERENCE TO RELATED APPLICATION

This application is a continuation of and claims the benefit of priority under 35 USC §120 from U.S. Ser. No. 10/490,206, filed Sep. 2, 2004, now U.S. Pat. No. 7,326,270, issued Feb. 5, 2008, and claims the benefit of priority under 35 U.S.C. §119 from Japanese Patent Application No. 2002-267819, filed Sep. 13, 2002, and Japanese Patent Application No. 2003-057631, filed Mar. 4, 2003, the entire contents of each of which are incorporated herein by reference.

TECHNICAL FIELD

The present invention relates to a filter used for removing particulates and the like contained in exhaust gases discharged from an internal combustion engine such as a diesel engine and the like.

BACKGROUND ART

In recent years, particulates, contained in exhaust gases discharged from internal combustion engines of vehicles such as buses, trucks, construction machines and the like, have raised serious problems as contaminants harmful to the environment and the human body.

For this reason, there have been proposed various ceramics filters which allow exhaust gases to pass through porous ceramics to collect particulates in the exhaust gases, so that the exhaust gases can be purified.

Conventionally, with respect to the ceramics filters of this type, as shown in FIG. 9, there has been known a column-shaped honeycomb structural body 140 in which a number of through holes 141 are placed in parallel with one another in the length direction with a partition wall 143 interposed there between.

As shown in FIG. 9(b), the through hole 141 is sealed with a sealing material 142 at one of its exhaust-gas inlet side and outlet side, so that exhaust gases that have entered one through hole 141 are discharged from another through hole 141 after having always passed through a partition wall 143 that separates the through holes 141.

In other words, when the honeycomb structural body 140 is placed in an exhaust gas passage of an internal combustion engine, particulates in exhaust gases discharged from the internal combustion engine are captured by the partition wall 143 when passing through the honeycomb structural body 140, so that the exhaust gases are purified.

Moreover, with respect to such an exhaust gas filter, a filter having the following structure has been proposed: through holes of two kinds, that is, a through hole with the end on the exhaust-gas outlet side being sealed (hereinafter, referred to as inlet-side through hole) is prepared as a through hole with a larger capacity (hereinafter, also referred to as large-capacity through hole) and a through hole with the end on the exhaust-gas inlet side being sealed (hereinafter, referred to as outlet-side through hole) is prepared as a through hole with a smaller capacity (hereinafter, also referred to as small-capacity through hole), so that the aperture ratio on the exhaust-gas inlet side is made relatively greater than the aperture ratio on the exhaust-gas outlet side.

FIG. 10 schematically shows a cross section perpendicular to the length direction of an exhaust gas filter disclosed in U.S. Pat. No. 4,417,908 (corresponding to JP Kokai Sho 58-196820, JP Kokoku Hei 3-49608 (hereinafter, referred to as Patent Literature 1)).

This exhaust-gas filter 60 has a cross-sectional structure in which squares, each smaller than each of square shapes constituting the checker board pattern, are placed on intersections of the checker board pattern, and this structure is constituted by small-capacity through holes 61b corresponding to the smaller squares and large-capacity through holes 61a located on the periphery thereof, with the partition wall 62a, 62b being formed between these through holes.

Moreover, FIGS. 11(a) to 11(d) schematically show cross-sections perpendicular to the length direction of exhaust-gas filters disclosed in U.S. Pat. No. 4,364,761 (corresponding to JP Kokai Sho 56-124417 and JP Kokai Sho 62-96717 (hereinafter, referred to as Patent Literature 2) and U.S. Pat. No. 4,276,071 (corresponding to JP Kokai Sho 56-124418)).

In these exhaust-gas filters 300 to 330, large-capacity through holes 301a, 311a, 321a, 331a and small-capacity through holes 301b, 311b, 321b, 331b having various shapes are formed, and partition walls 302, 312, 322, 332 are formed between these through holes.

Each of the partition walls 302, 312, 322, 332 separates each of the large-capacity through holes 301a, 311a, 321a, 331a and each of the small-capacity through holes 301b, 311b, 321b, 331b from one another, and there are substantially no partition wall that separates the large-capacity through holes 301a, 311a, 321a, 331a from each other.

In general, these filters have an increased pressure loss as particulates in exhaust gases are collected. Accordingly, the back pressure increases and, when the back pressure has exceeded a predetermined value, the load imposed on an engine or the like becomes greater, so that a recovery process needs to be carried out to eliminate the particulates. Therefore, the degree of pressure loss with elapsed time forms an important factor in evaluating the filter performances.

FIG. 1 is a conceptual diagram that shows main factors giving influences to the pressure loss.

As shown in FIG. 1, the main factors that give influences to the pressure loss include ① aperture ratio on the filter inlet side: $\Delta P_a$, ② friction upon passage through holes (inlet side ②-1: $\Delta P_{b-1}$, outlet side ②-2: $\Delta P_{b-2}$), ③ resistance upon passage through a partition wall: $\Delta P_c$ and the like.

Moreover, FIG. 2 is a graph that schematically shows variations in the pressure loss with elapsed time in each of the various exhaust-gas filters.

In the case of exhaust-gas filters having two types of through holes disclosed in Patent Literatures 1, 2 and the like, in comparison with the exhaust-gas filter in which the cross-sectional shape is a square shape, as shown in FIG. 9, with all the through holes having almost the same capacity, in a state prior to collection of particulates, a pressure loss derived from the aperture ratio on the filter inlet side and friction exerted upon passage through inlet-side through holes (①: $\Delta P_a$+②-1: $\Delta P_{b-1}$) is slightly reduced; however, a pressure loss derived from friction exerted upon passage through outlet-side through hole and resistance exerted upon passage through a partition wall (②-2: $\Delta P_{b-2}$+③: $\Delta P_c$) is increased. Consequently, it has been confirmed that the pressure loss prior to collection of particulates becomes higher in comparison with the exhaust-gas filter in which all the through holes have substantially the same capacity as shown in FIG. 9.

Further, in the case of an exhaust-gas filter in which most of wall portion of an exhaust-gas filter are constituted by wall portion (i) which is shared by one large-capacity through hole and the adjacent large-capacity through hole in the cross section perpendicular to the length direction and wall portion (ii) which is shared by one large-capacity through hole and the adjacent small-capacity through hole in the cross section perpendicular to the length direction, the pressure loss is varied depending on the ratio of these two kinds of wall portion.

For example, supposing that the aperture ratio is constant, when the rate of the wall portion (i) is great, it becomes difficult for exhaust gases to directly pass through the wall portion (ii) from the large-capacity through hole to flow into the small-capacity through hole; therefore, the pressure loss prior to collecting particulates ($T_0$) tends to become higher.

However, since particulates are accumulated on the surface of the wall portion (ii) as the particulates are collected, the flow of exhaust gases that once enters the wall portion (i) and are transmitted over the porous wall to flow into the wall portion (ii) is under less resistance than the flow of exhaust gases that directly pass through the wall portion (ii) from the large-capacity through hole to flow into the small-capacity through hole, with the result that particulates are accumulated evenly over the entire wall portion constituting the large-capacity through hole. Therefore, the thickness of the particulates to be accumulated over the wall portion is reduced, so that it becomes possible to reduce the rising rate ($\Delta P_3/(T_1-T_0)$) of the pressure loss that increases as particulates accumulate.

Here, in the case where, in contrast, this rate is small, although the pressure loss prior to collecting particulates ($T_0$) becomes lower, the rising rate ($\Delta P_3/(T_1-T_0)$) of the pressure loss that increases as particulates accumulate tends to increase.

In the exhaust-gas filter 60 disclosed in Patent Literature 1 (FIG. 10), the rate of wall portion (i) which is shared by the adjacent large-capacity through holes is comparatively great. For this reason, as shown in FIG. 2, the pressure loss (hereinafter, referred to as initial pressure loss) prior to collecting particulates ($T_0$) becomes higher due to high resistance (③: $\Delta P_c$) upon passage through a partition wall, and the pressure loss upon collecting particulates ($T_1$) also becomes higher since the initial pressure loss is too high.

Therefore, from the viewpoint of engine management, a recovery process needs to be carried out before a prescribed amount of particulates has been accumulated. In other words, since the initial pressure loss is too high, the exhaust-gas filter 60 has a problem that substantially only a limited amount of particulates is collected.

Moreover, in the case of exhaust-gas filters 300 to 330 disclosed in Patent Literature 2 (FIG. 11), partition walls (i) separating the large-capacity through holes 301a, 311a, 321a and 331a from each other are in a point-contact state, and hardly exist.

For this reason, as shown in FIG. 2, due to a high rising rate ($\Delta P_3/(T_1-T_0)$) of the pressure loss that increases as particulates accumulate, the pressure loss upon collecting particulates ($T_1$) becomes too high.

Therefore, from the viewpoint of engine management in the same manner, a recovery process needs to be carried out before a prescribed amount of particulates have been accumulated. In other words, since the rising rate of pressure loss upon collecting particulates is high, the exhaust gas filters 300 to 330 have a problem that substantially only a limited amount of particulates is collected.

With respect to another conventional technique, microfilms of Japanese Utility Model Application No. 56-187890 (J UM Kokai Sho 58-92409 (see FIG. 6, page 4), hereinafter, referred to as Patent Literature 3), have disclosed a honeycomb structural body with cell pitches of large-capacity through holes being set almost in a range from 1.0 to 2.5 mm.

JP Kokai Hei 5-68828 (Japanese Patent gazette No. 3130587 (page 1), hereinafter, referred to as Patent Literature 4) has disclosed a honeycomb structural body in which the capacity rate of the large-capacity through holes is set to 60 to 70% while the capacity rate of the small-capacity through holes is set to 20 to 30%, with the cell pitch of the large-capacity through holes being set to almost in a range from 2.5 to 5.0 mm.

FIG. 19 is a cross-sectional view that schematically shows a cross section perpendicular to the length direction (hereinafter, simply referred to as cross section) of this honeycomb structural body 200, and this honeycomb structural body 200 has a structure in which small-capacity through holes 202, each having a triangular shape in its cross section, are placed on the periphery of a large-capacity through hole 201 having a hexagonal shape in its cross section.

Moreover, JP Kokai 2001-334114 (see FIG. 2, page 5) (WO 02/100514, hereinafter, referred to as Patent Literature 5) has disclosed a honeycomb structural body in which the ratio of the total area of the cross-section of small-capacity through holes to the total area of the cross-section of large-capacity through holes is set in a range from 40 to 120%.

FIG. 20 is a cross-sectional view that schematically shows a cross section perpendicular to the length direction of such a honeycomb structural body, and in this honeycomb structural body 210, small-capacity through holes 212, each having an laterally elongated hexagonal shape in its cross section, are placed on the periphery of a large-capacity through hole 211 having a right hexagonal shape in its cross section. Moreover, in the vicinity of the circumference thereof, the large-capacity through holes 211 having a right hexagonal shape and large-capacity through holes 213 having a trapezoidal shape are placed also in parallel with each other.

Furthermore, another structure in which the number of inlet-side through holes is made greater than the number of outlet-side through holes, so that the aperture ratio on the exhaust-gas inlet side is relatively greater than the aperture ratio on the exhaust-gas outlet side has also been disclosed (for example, see FIG. 3 of Patent Literature 1).

In the honeycomb filter of this type also, in comparison with the exhaust-gas filter in which the number of the cells on the inlet side and the number of the cells on the outlet side are different from each other and the cross-sectional shape shown in FIG. 9 is a quadrangle, with all the through holes having almost the same capacity, in a state prior to collection of particulates, a pressure loss derived from the aperture ratio on the inlet side and friction exerted upon passage through inlet-side through holes (①: $\Delta P_{a-2}$+②-1: $\Delta P_{b-1}$) is slightly reduced; however, the pressure loss derived from friction exerted upon passage through outlet-side through holes and resistance exerted upon passage through a partition wall (②-2: $\Delta P_{b-2}$+③: $\Delta P_c$) is increased. Consequently, the pressure loss prior to collection of particulates becomes higher in comparison with the exhaust-gas filter in which all the through holes have substantially the same capacity as shown in FIG. 9.

Moreover, U.S. Pat. No. 4,416,676 and U.S. Pat. No. 4,420,316 (hereinafter, referred to as Patent Literature 6) have disclosed techniques for adjusting the thickness of walls and physical properties; however, it was difficult to reduce the pressure loss by using only these techniques.

Further, JP Kokai Sho 58-150015 has disclosed a filter which is provided with square through holes and rectangular through holes; however, since this filter has a reformed cross section, it is difficult to manufacture the filter through an extrusion-molding process, and it is also difficult to mass produce the filter. Also, even without the reform of the cross section, the resistance of gases on the outlet side becomes higher to cause high pressure loss, since there is a difference between those having relatively large cross section and those having relatively small cross section in through holes on the outlet side.

In order to solve this conventional problem, filters having two types of through hole shapes, that is, in particular, a filter constituted by an octagonal shape and a square shape has been proposed (see the specification of French Patent No. 2789327, WO 02/10562).

It has been confirmed that, by forming the filter into such shapes, the pressure loss is improved. However, the results of various experiments carried out on various shapes and aperture ratios has shown that it is difficult to satisfy both of low pressure loss and high crack limit, and consequently, the amount of collection of particulates is limited. In addition, these filters are inferior in isostatic strength and compression strength.

Moreover, with respect to a conventional technique, WO 03/20407 has disclosed a honeycomb structural body in which two types of through holes, that is, relatively large square-shaped through holes and small through holes, are provided.

However, this filter still has high pressure loss, and is poor in isostatic strength and compression strength, thus, it was difficult to increase crack limit thereof.

As described above, in all the honeycomb structural bodies described in conventional techniques, since the aperture ratio on the exhaust-gas inlet side is made relatively greater in comparison with the honeycomb structural body in which the aperture ratio on the exhaust-gas inlet side and the aperture ratio on the exhaust-gas outlet side are equal to each other, it becomes possible to increase the limit of particulate collection, and also to lengthen the period up to the recovery process, when used as an exhaust gas purifying filter.

However, it has been found that, in comparison with a normal filter (that is, a filter in which the aperture ratios on the exhaust-gas inlet side and outlet side are the same), these filters have considerably high initial pressure loss. In addition, these filters cause degradation in strength. Therefore, these fail to satisfy properties such as high isostatic strength, high compression strength and high crack limit, as well as maintaining a low pressure loss.

SUMMARY OF THE INVENTION

The present invention has been devised so as to solve the above-mentioned problems, and its object is to provide a filter which has a low pressure loss upon collecting particulates, and makes it possible to collect a great amount of particulates. Here, in the present specification, collecting a great amount of particulates means not only the fact that the capacity of the collecting portion of the filter is simply increased, but also the fact that the filter becomes less likely to generate cracks due to the recovery process, so that a great amount of particulates can be collected.

The filter of the present invention is a columnar filter having a honeycomb structure in which a number of through holes that are placed in parallel with one another in the length direction with wall portion interposed therebetween, wherein: the above-mentioned through holes comprises two types of through holes, which are large-capacity through holes having a relatively larger cross-sectional area in the cross section perpendicular to the length direction and small-capacity through holes having a relatively smaller cross-sectional area in the above-mentioned cross section, with the numbers of the two types of through holes being substantially set to the same; the above-mentioned large-capacity through holes are sealed at one end of the above-mentioned filter, while the above-mentioned small-capacity through holes are sealed at the other end of the above-mentioned filter; and supposing that the ratio (a/b) of the total (a) of lengths of wall portion which is shared by the above-mentioned one large-capacity through hole and the above-mentioned adjacent large-capacity through hole in the cross section perpendicular to the length direction to the total (b) of lengths of wall portion which is shared by the above-mentioned one large-capacity through hole and the above-mentioned adjacent small-capacity through hole in the cross section perpendicular to the length direction is defined as $\alpha$ and that the ratio (A/B) of the area (A) of the above-mentioned cross section of the above-mentioned large-capacity through hole to the area (B) of the above-mentioned cross section of the above-mentioned small-capacity through hole is defined as $\beta$, $\alpha$ and $\beta$ satisfy the relationship represented by the following formula (1):

$$\beta \geq (20/9)\alpha^2 + 1 \text{ (where } 0 < \alpha \leq 1.5 \text{ and } 1 < \beta \leq 6) \qquad (1).$$

In the above-mentioned filter, the shapes of the cross section perpendicular to the length direction of the large-capacity through holes and/or the small-capacity through holes are desirably formed as: an octagonal shape; and a quadrangle or square shape, and the shapes are desirably designed so that a part of the partition wall shared by the large-capacity through hole and the small-capacity through hole is expanded toward the small-capacity side with a predetermined curvature.

The following description will describe the filter of the present invention.

In the present invention, the total (b) of lengths of wall portion which is shared by one large-capacity through hole and the adjacent small-capacity through hole in the cross section perpendicular to the length direction represents the total of the lengths of the part of the partition wall through which exhaust gases are allowed to pass perpendicularly when the cross section of the filter is viewed. And, the total (a) of lengths of wall portion which is shared by one large-capacity through hole and the adjacent large-capacity through hole represents the total of the lengths of the part of the partition wall through which exhaust gases are not allowed to pass perpendicularly when the cross section of the filter is viewed. This value $\alpha$ (a/b) is also referred to as a ratio of partition-wall lengths. When this value $\alpha$ (ratio of partition-wall lengths) becomes greater, the rate of area of the partition wall through which exhaust gases are allowed to pass perpendicularly becomes smaller, and in contrast, when this value $\alpha$ (ratio of partition-wall lengths) becomes smaller, the rate of area of the partition wall through which exhaust gases are allowed to pass perpendicularly becomes greater. Thus, this value $\alpha$ (ratio of partition-wall lengths) gives great influences to the pressure loss, particulate accumulating state and the like, as described earlier.

Here, the ratio $\beta$(A/B) of the area (A) of the cross section of the large-capacity through hole to the area (B) of the cross section of the small-capacity through hole represents the aperture ratio of the filter of the present invention and, as the aperture ratio becomes higher, the total capacity of the large-capacity through holes on the exhaust-gas inlet side becomes relatively greater.

The above-mentioned formula (1) was determined in the following manner. At the time of the initial state ($T_0$) and particulate-collecting state ($T_1$), calculations were carried out or measurements were made through experiments as to how the total value of the pressure losses caused by these states was varied in association with the values of $\alpha$ and $\beta$ and, based upon the results of these, the formula (1) was determined.

In this case, α(a/b) needs to satisfy 0<α≦1.5. When α=0, no wall portion shared by one large-capacity through hole and the adjacent large-capacity through hole exists, the rising rate of the pressure loss becomes higher in the same manner as the filter disclosed in Patent Literature 2. In contrast, in the case where this value α exceeds 1.5, since the total (a) of the lengths of wall portion which is shared by one large-capacity through hole and the adjacent large-capacity through hole becomes too high, ③ resistance upon passage through the partition wall: $\Delta P_c$ increases, resulting in an increased initial pressure loss.

Moreover, β(A/B) needs to satisfy 1<β≦6. In the case of β=1, the small-capacity through holes and the large-capacity through holes come to have the same capacity, and when β exceeds 6, the capacity of the small-capacity through holes becomes too small, and the pressure loss caused by friction upon passage of the through-hole outlet side and resistance upon passage of the partition wall ((②)-2: $\Delta P_{b-2}$+③: $\Delta P_c$) increases, making the initial pressure loss greater.

In the case of the filter that does not satisfy formula (1), that is, the filter that satisfies β<(20/9) α²+1, α becomes too great as compared with β. In other words, the total (a) of the lengths of wall portion which is shared by one large-capacity through hole and the adjacent large-capacity through hole becomes too long in comparison with the total (b) of lengths of wall portion which is shared by one large-capacity through hole and the adjacent small-capacity through hole. For this reason, the pressure loss caused by ③ resistance upon passage through the partition wall: $\Delta P_c$ becomes too great, resulting in an increased initial pressure loss as in the case of the filter disclosed in Patent Literature 1.

By properly setting the above-mentioned values of a, b, A and B in such a manner that α and β satisfy the relationship of formula (1), it becomes possible to prevent the initial ($T_0$) pressure loss from becoming too high as shown in FIG. 2 and, also, to suppress the rising rate ($\Delta P_1/(T_1-T_0)$) of the pressure loss that increases as particulates accumulate; thus, it is possible to reduce the pressure loss ($T_1$) at the time when a prescribed amount of particulates have been accumulated.

Consequently, it is possible to reduce the pressure loss from the viewpoint of the period during which the filter is used as a whole and, with this arrangement, it becomes possible to reduce loads to be imposed on the engine, to reduce the possibility of problems such as engine stop, and also to collect a great amount of particulates.

Here, the expression, "comprises two types of through holes, which are, large-capacity through holes having a relatively larger cross-sectional area in the cross section perpendicular to the length direction and small-capacity through holes having a relatively smaller cross-sectional area in the above-mentioned cross section, with the numbers of the two types of through holes being substantially set to the same", refers to the fact that, although, when viewed from the cross section perpendicular to the length direction, the filter of the present invention sometimes does not have the same number of the large-capacity through holes and the small-capacity through holes because of its outline shape or the like, it is constituted by the same number of through holes of the two types from the viewpoint of a predetermined pattern constituted by the large-capacity through holes and the small-capacity through holes.

Therefore, for example, such filters, as shown in FIG. 19, in which a number of small-capacity through holes are located on the periphery of a large-capacity through hole, or vice-versa, are not included in the present invention. Moreover, such filters, as shown in FIG. 11, in which no wall portion shared by one large-capacity through hole and the adjacent large capacity through hole exists, are not included in the filter of the present invention.

BRIEF DESCRIPTION OF THE DRAWINGS

FIGS. 9 (a and b) is a perspective view that schematically shows an example of a conventional exhaust gas purifying honeycomb filter.

EXPLANATION OF SYMBOLS

Figure 1:
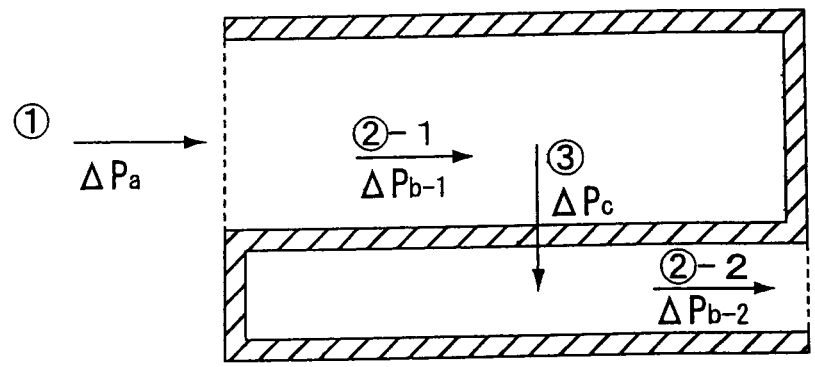
FIG. 1 is a conceptual diagram that illustrates main factors causing a pressure loss in each of filters of types as shown in the present invention.
Figure 2:
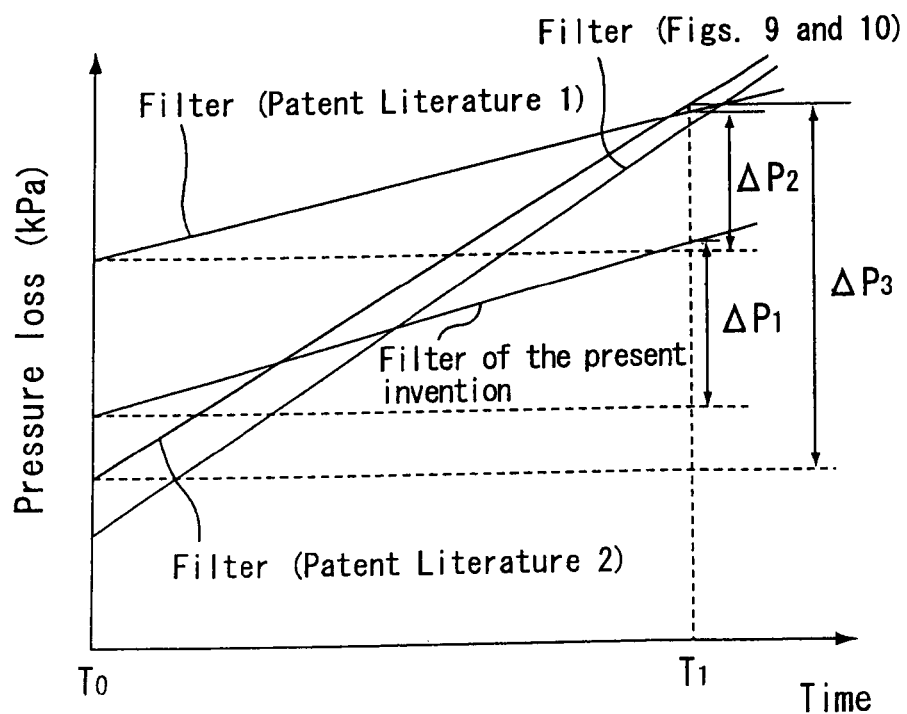
FIG. 2 is a graph that schematically shows changes in pressure loss with elapsed time in each of various exhaust gas filters.

| EXPLANATION OF SYMBOLS | |
|---|---|
| 10, 30 | filter |
| 13, 14 | sealing material layer |
| 15 | ceramics block |
| 20, 40, 50, 70 | porous ceramics member |
| 160, 170, 180, 260, 270, 280 | porous ceramics member |
| 21a, 31a, 41a, 51a, 71a | large-capacity through hole |
| 161a, 171a, 181a, 261a, 271a, 281a | large-capacity through hole |
| 21b, 31b, 41b, 51b, 71b | small-capacity through hole |
| 161b, 171b, 181b, 261b, 271b, 281b | large-capacity through hole |
| 22 | sealing material |
| 23, 43, 53, 73 | partition wall |
| 163, 173, 183, 263, 273, 283 | partition wall |
| 33 | wall portion |

DETAILED DISCLOSURE OF THE INVENTION

The filter of the present invention is a columnar filter having a honeycomb structure in which a number of through holes that are placed in parallel with one another in the length direction with wall portion interposed therebetween, wherein: the above-mentioned through holes comprises two types of through holes, which are, large-capacity through holes having a relatively larger cross-sectional area in the cross section perpendicular to the length direction and small-capacity through holes having a relatively smaller cross-sectional area in the above-mentioned cross section, with the numbers of the two types of through holes being substantially set to the same; the above-mentioned large-capacity through holes are sealed at one end of the above-mentioned filter, while the above-mentioned small-capacity through holes are sealed at the other end of the above-mentioned filter; and supposing that the ratio (a/b) of the total (a) of lengths of wall portion which is shared by the above-mentioned one large-capacity through hole and the above-mentioned adjacent large-capacity through hole in the cross section perpendicular to the length direction to the total (b) of lengths of wall portion which is shared by the above-mentioned one large-capacity through hole and the above-mentioned adjacent small-capacity through hole in the cross section perpendicular to the length direction is defined as α and that the ratio (A/B) of the area (A) of the above-mentioned cross section of the above-mentioned large-capacity through hole to the area (B) of the above-mentioned cross section of the above-mentioned small-capacity through hole is defined as β, α and β satisfy the relationship represented by the following formula (1):

$$\beta \geq (20/9) \alpha^2 + 1 \text{ (where } 0 < \alpha \leq 1.5 \text{ and } 1 < \beta \leq 6) \tag{1}.$$

The filter of the present invention is a columnar filter having a honeycomb structure in which a number of through holes are placed in parallel with one another in the length direction with wall portion being interposed therebetween. This filter preferably has a structure which includes at least one porous ceramics block. This porous ceramics block may be formed by combining a plurality of column-shaped porous ceramics members, each having a plurality of through holes that are placed in parallel with one another in the length direction with wall portion being interposed therebetween, with one another through sealing material layers (this filter is hereinafter also referred to as an aggregate-type filter), or may be formed by a ceramics member that is entirely sintered and formed as one integral unit (this filter is hereinafter also referred to as an integrated-type filter).

In the case of the aggregate-type filter, wall portion is constituted by: a partition wall that separates through holes of the porous ceramics members from each other; and a sealing material layer that serves as an outer wall of the porous ceramics member and an adhesive layer interposed between the porous ceramics members and, in the case of the integrated-type filter, wall portion is constituted by a partition wall of only one type.

Figure 3:
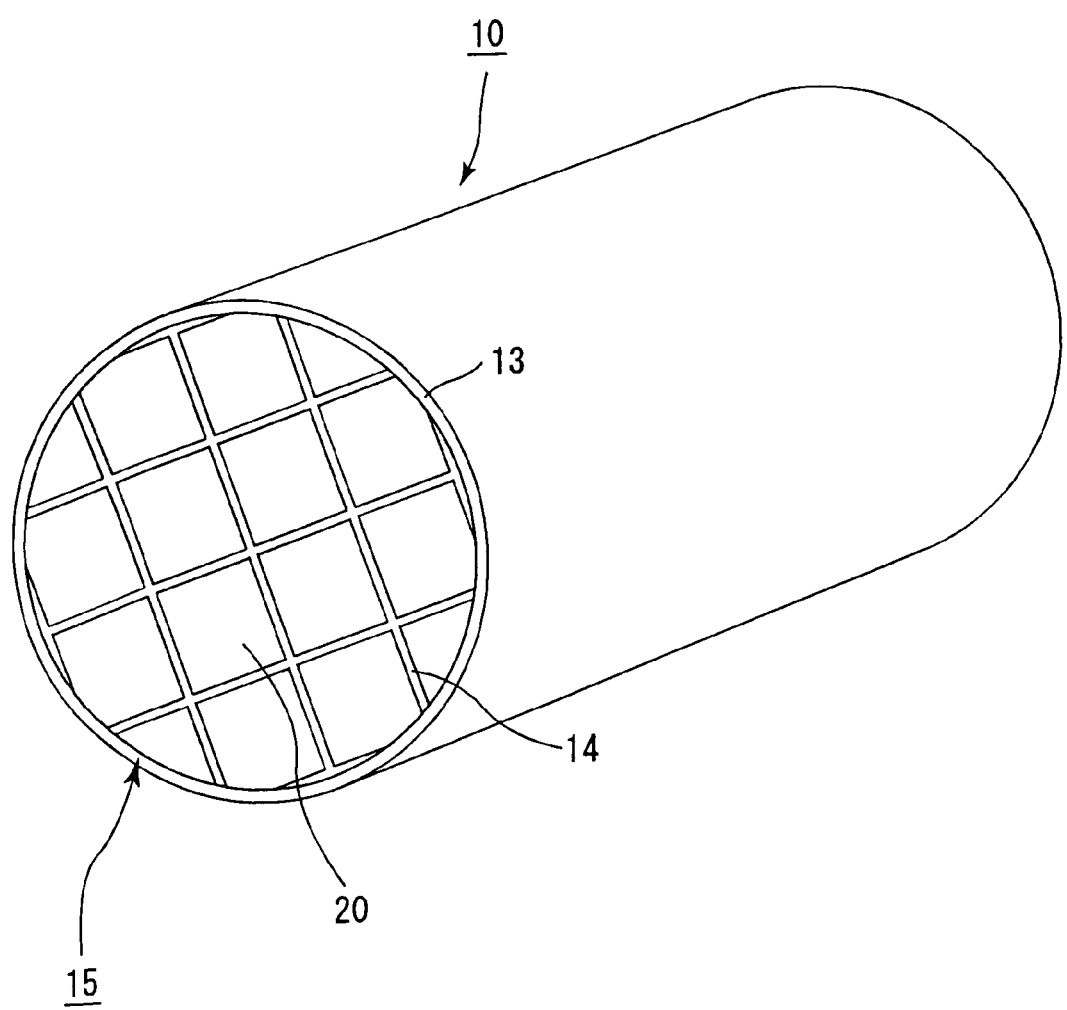
FIG. 3 is a perspective view that schematically shows one example of an exhaust gas purifying filter of the present invention.

FIG. 3 is a perspective view that schematically shows a specific example of an aggregate-type filter as one example of the filter of the present invention, FIG. 4(a) is a perspective view that schematically shows one example of a porous ceramics member forming the filter shown in FIG. 1, and FIG. 4(b) is a cross-sectional view taken along line A-A of the porous ceramics member shown in FIG. 4(a).

As shown in FIG. 3, a filter 10 of the present invention has a structure in that a plurality of porous ceramics members 20 are combined together through sealing material layers 14 to form a ceramics block 15 and a sealing material layer 13 for preventing leak of exhaust gases is formed on the circumference of this ceramics block 15.

Moreover, in the porous ceramics member 20, a number of through holes 21 are placed in parallel with one another in the length direction. Each through hole 21 is constituted by a large-capacity through hole 21a having a relatively large area in the cross section perpendicular to the length direction and a small-capacity through hole 21b having a relatively small area in the above-mentioned cross section. The large-capacity through hole 21a is sealed by a sealing member 22 at the end on the exhaust-gas outlet side of the filter 10, while the small-capacity through hole 21b is sealed by a sealing member 22 at the end on the exhaust-gas inlet side of the filter 10; thus, a partition wall 23 separating these through holes from each other is allowed to serve as a filter. In other words, exhaust gases that have been allowed to flow into the large-capacity through holes 21a are discharged from the small-capacity through hole 21b after having always passed through the partition wall 23.

Figure 19:
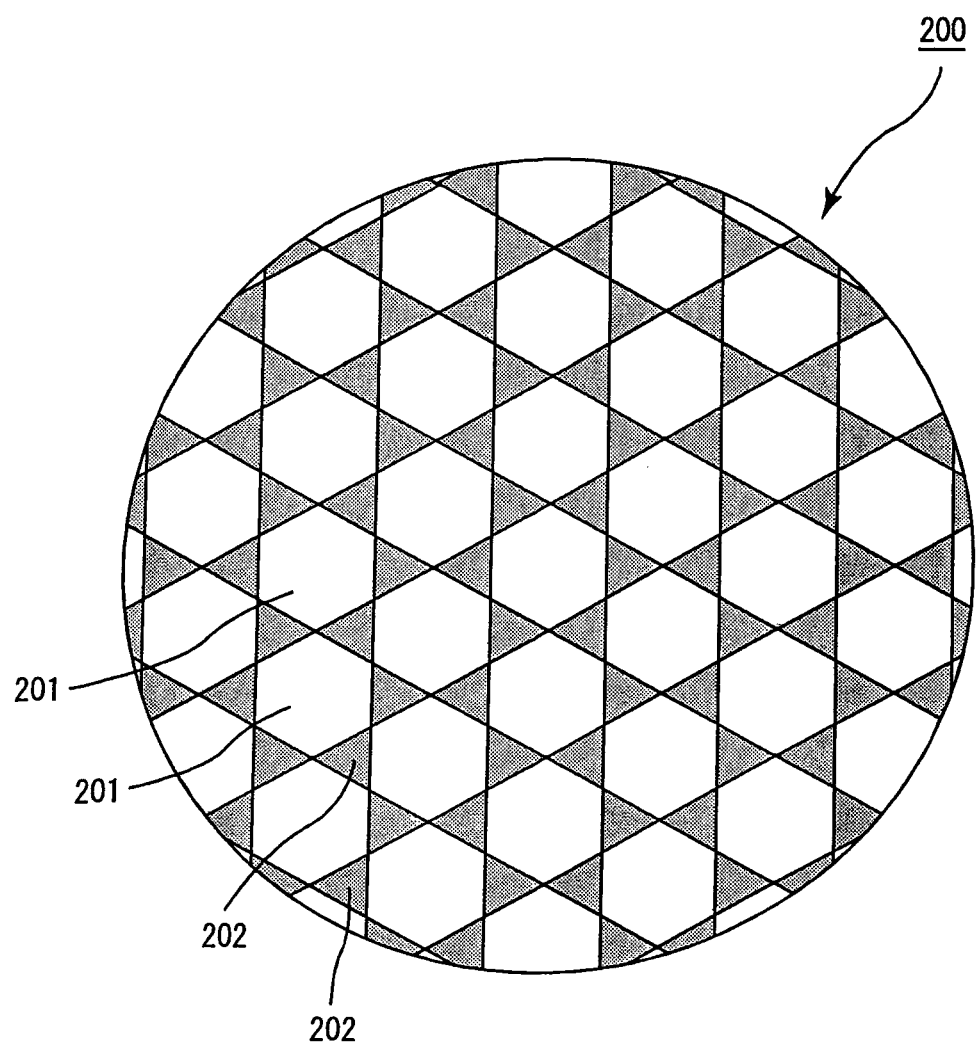
FIG. 19 is a cross-sectional view that schematically shows a cross section perpendicular to the length direction of a conventional porous ceramics member in which the ratio of numbers between large-capacity through holes and small-capacity through holes is substantially set to 1:2.

In the filter of the present invention, each through hole 21 is constituted by two types of through holes, that is, the large-capacity through hole 21a and the small-capacity through hole 21b, and the numbers of these through holes are substantially the same. With this arrangement from which unnecessary divisions of through holes are eliminated, it becomes possible to prevent the pressure loss caused by friction upon passage of gases on the through-hole inlet side and/or friction upon passage of gases on the through-hole outlet side (②-1: $\Delta P_{b-1}$, ②-2: $\Delta P_{b-2}$) from increasing unnecessarily. For example, in comparison with a filter in which the numbers of the through holes are substantially set to 1:2 as shown in FIG. 19, the filter of the present invention in which the numbers of the through holes are substantially the same has a lower pressure loss caused by the friction upon passage of gases on the through-hole outlet side (②-2: $\Delta P_{b-2}$), thereby making it possible to reduce the total pressure loss.

Moreover, the filter of the present invention has two kinds of the wall portion, that is: the wall portion shared by one large-capacity through hole 21a and the adjacent large-capacity through hole 21b; and the wall portion shared by one large-capacity through hole 21a and the adjacent small-capacity through hole 21b.

Figure 14:
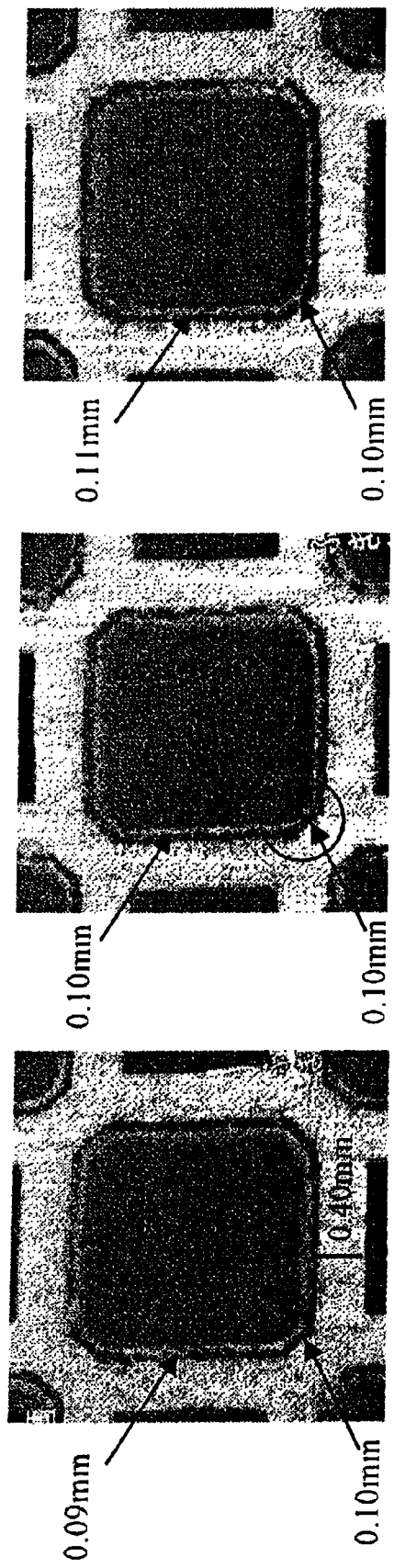
FIGS. 14(a) to 14(c) are photographs that show collected states of particulates observed at different positions from the filter inlet in Example 1.

FIGS. 14(a) to 14(c) are photographs that show collected states of particulates observed at different positions from the inlet of the filter. As clearly shown by these photographs, in the filter of the present invention, particulates are evenly deposited not only on the wall portion shared by the adjacent large-capacity through hole and small-capacity through hole, but also on the wall portion shared by the mutually adjacent large-capacity through holes. This is presumably because in addition of a direct flow from the large-capacity through hole toward the small-capacity through hole via the filter wall, exhaust gases generate various flows such as vortical flows in the hole, and as particulates have been collected, a flow of the exhaust gases, which, after having entered the wall portion shared by the mutually adjacent large-capacity through holes, passes through the wall portion shared by the adjacent large-capacity through hole and small-capacity through hole, and is directed to the small-capacity through hole, is formed.

As a result, in the case where the capacity ratio of the large-capacity through hole and the small-capacity through hole is set to a constant value, in the filter having both kinds of the wall portion also, particulates are evenly deposited on all the wall of the large-capacity through hole, as the filter is continuously used. Therefore, in the case where the aperture ratio is set to a constant value, in comparison with a filter having no wall portion that is shared by the mutually adjacent large-capacity through holes, the filter of the present invention is allowed to have a larger surface area of the wall portion to be substantially used for filtering. Thus, in the case of the same amount of particulates to be deposited, it becomes possible to reduce the thickness of the particulates deposited on the partition wall portion. For this reason, as time elapses from the start of the use, the rising rate of an increasing pressure loss becomes smaller in the filter of the present invention, so that it becomes possible to reduce the pressure loss from the viewpoint of the total period of the filter use.

Moreover, in order to recover the filter, particulates need to be burned, and in addition to carbon and the like that are burned to be eliminated, the particulates contain metals and the like that are burned to form oxides, so that these remain in the filter as ashes. Since the ashes normally remain at portions closer to the outlet of the filter, the through holes constituting the filter are gradually filled with ashes from portions closer to the outlet, with the result that the volume of the portion filled with the ashes becomes gradually greater, while the volume (area) of the portions functioning as the filter becomes gradually smaller.

Further, when the accumulated amount of ashes becomes too large, this filter no longer serves as a filter; therefore, it is taken out from an exhaust pipe so that the filter is subjected to back wash to remove ashes from the filter, or the filter is disposed.

In comparison with a filter in which the capacities of through holes are all the same, since the capacity of the through hole on the exhaust-gas inlet side is greater, the above-mentioned filter of the present invention is less susceptible to reduction in the capacity of the portion functioning as a filter due to accumulation of ashes, making it possible to reduce the pressure loss caused by ashes. Therefore, it is possible to lengthen the service life of the filter up to the necessity of back-wash or the like.

The filter 10 shown in FIG. 3 has a cylindrical shape; however, not particularly limited to the cylindrical shape, the filter of the present invention may have an optional shape, such as an elliptical column shape or a square column shape, and an optional size.

In the filter of the present invention, the honeycomb structure is desirably designed so as not to have a varied cross-sectional area from the inlet side toward the outlet side. This structure makes it possible to improve the compression strength and the like and, also, to provide easier manufacturing processes through extrusion molding.

With respect to the material of the porous ceramics member of the present invention, although not particularly limited, examples thereof may include: nitride ceramics such as aluminum nitride, silicon nitride, boron nitride, titanium nitride and the like; carbide ceramics such as silicon carbide, zirconium carbide, titanium carbide, tantalum carbide, tungsten carbide and the like; and oxide ceramics such as alumina, zirconia, cordierite, mullite and the like. Moreover, the filter may be made from two or more kinds of materials, such as a composite material of silicon and silica carbide, and aluminum titanate. In particular, silicon carbide, which has great heat resistance, superior mechanical properties and great thermal conductivity, is desirably used.

Although not particularly limited, the porosity of the porous ceramics member is desirably set to about 20 to 80%. When the porosity is less than 20%, the filter of the present invention is more susceptible to clogging, while the porosity exceeding 80% causes degradation in the strength of the porous ceramics member, with the result that it might be easily broken.

Here, the above-mentioned porosity can be measured through known methods such as a mercury press-in method, Archimedes' method and a measuring method using a scanning electronic microscope (SEM).

The average pore diameter of the porous ceramics member is desirably set in a range from 1 to 100 μm. The average pore diameter of less than 1 μm tends to cause clogging of particulates easily. In contrast, the average pore diameter exceeding 100 μm tends to cause particulates to pass through the pores, with the result that the particulates cannot be collected, making the porous ceramics member unable to function as a filter.

With respect to the particle size of ceramics to be used upon manufacturing the porous ceramics member, although not particularly limited, those which are less susceptible to shrinkage in the succeeding sintering process are desirably used, and for example, those particles, prepared by combining 100 parts by weight of powder having an average particle size of about 0.3 to 50 μm with 5 to 65 parts by weight of powder having an average particle size of about 0.1 to 1.0 μm, are desirably used. By mixing ceramic powders having the above-mentioned respective particle sizes at the above-mentioned blending rate, it is possible to properly manufacture a porous ceramics member.

The above-mentioned sealing member is desirably made from porous ceramics.

In the filter of the present invention, since the porous ceramics member using the above-mentioned sealing member is made from porous ceramics, it becomes possible to increase the bonding strength of the two members by using the sealing member made from the same porous ceramics as the porous ceramics member and, also, to make the coefficient of thermal expansion of the wall portion consistent with the coefficient of thermal expansion of the sealing material, by adjusting the porosity of the sealing member in the same manner as the porous ceramics member; thus, it becomes possible to prevent a gap from generating between the sealing member and the wall portion due to a thermal stress exerted upon manufacturing and using and, also, to prevent cracks from occurring in the sealing member and the wall portion that is made in contact with the sealing member.

In the case of the sealing member made from porous ceramics, although not particularly limited, for example, the same material as the ceramics material forming the above-mentioned porous ceramics member may be used.

In the filter of the present invention, the sealing material layers 13 and 14 are formed between the porous ceramics members 20 as well as on the circumference of the ceramics block 15. Moreover, the sealing material layer 14 formed between the porous ceramics members 20 is also allowed to function as an adhesive used for binding a plurality of porous ceramics members 20, and the sealing material layer 13, formed on the circumference of the ceramics block 15, is allowed to function as a sealing member used for preventing leakage of exhaust gases from the circumferential portion of the ceramics block 15, when the filter 10 of the present invention is placed on an exhaust passage of an internal combustion engine.

The material for forming the sealing material layer is not particularly limited, and examples thereof may include materials made of an inorganic binder, an organic binder, inorganic fibers and/or inorganic particles.

Here, as described above, in the filter of the present invention, the sealing material layers are formed between the porous ceramics members as well as on the circumference of the ceramics block, and these sealing material layers may be made from the same material, or may be made from different materials. Moreover, in the case where the sealing material layers are made from the same material, the blending ratio of the materials may be the same or different.

Examples of the inorganic binder may include silica sol, alumina sol and the like. These may be used alone or two or more kinds of these may be used in combination. Among the inorganic binders, silica sol is more desirably used.

Examples of the organic binder may include polyvinyl alcohol, methyl cellulose, ethyl cellulose, carboxymethyl cellulose and the like. These may be used alone or two or more kinds of these may be used in combination. Among the organic binders, carboxymethyl cellulose is more desirably used.

Examples of the inorganic fibers may include ceramics fibers such as silica-alumina, mullite, alumina and silica. These may be used alone or two or more kinds of these may be used in combination. Among the inorganic fibers, silica-alumina fibers are more desirably used.

Examples of the inorganic particles may include carbides, nitrides and the like, and specific examples thereof may include inorganic powder made from silicon carbide, silicon nitride, boron nitride and the like or whiskers. These may be used alone, or two or more kinds of these may be used in combination. Among the inorganic particles, silicon carbide having superior thermal conductivity is desirably used.

Here, the sealing material layer 14 may be made from a dense material or may be made from a porous material so as to allow exhaust gases to enter the inside thereof. On the contrary, the sealing material layer 13 is desirably made from a dense material. This is because the sealing material layer 13 is formed so as to prevent exhaust gases from leaking from the circumference of the ceramics block 15 when the filter 10 of the present invention is placed in an exhaust passage of an internal combustion engine.

FIG. 5(a) is a perspective view that schematically shows a specific example of an integrated-type filter as one example of the filter of the present invention, and FIG. 5(b) is a cross-sectional view taken along line B-B of FIG. 5(a).

As shown in FIG. 5(a), the filter 30 is constituted by column-shaped porous ceramics blocks 35 each of which has a number of through holes 31 placed in parallel with one another in the length direction with wall portion 33 being interposed therebetween.

The through hole 31 is constituted by through holes of two types, that is, a large-capacity through hole 31a having a relatively large area in the cross section perpendicular to the length direction and a small-capacity through hole 31b having a relatively small area in the cross section. The large-capacity through hole 31a is sealed by a sealing member 32 at the end on the exhaust-gas outlet side of the filter 30, while the small-capacity through hole 31b is sealed by a sealing member 32 at the end on the exhaust-gas inlet side of the filter 30; thus, a partition wall 33 separating these through holes 31 from each other is allowed to serve as a filter.

Figure 5:
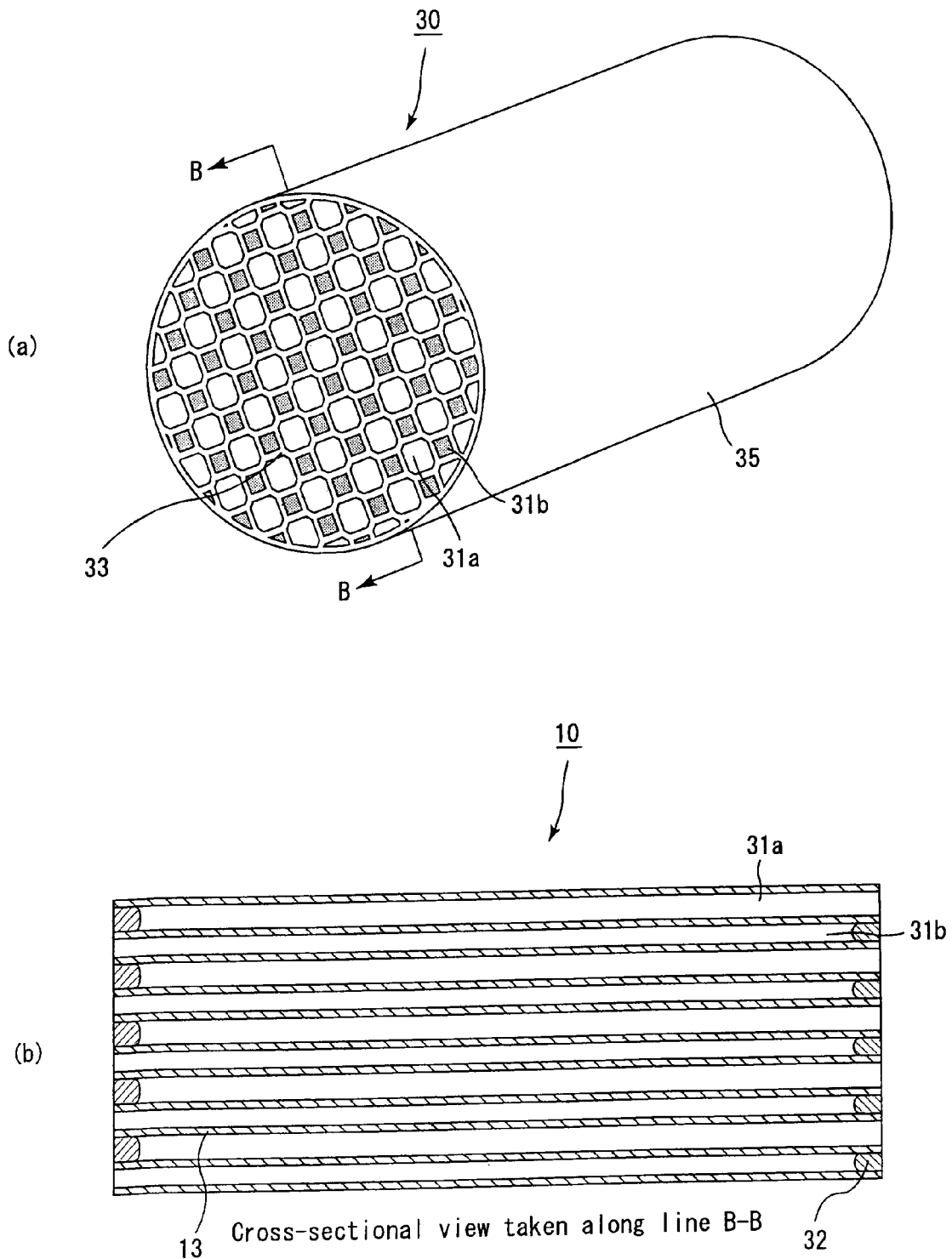
FIG. 5(a) is a perspective view that schematically shows another example of the exhaust gas purifying filter of the present invention.
FIG. 5(b) is a cross-sectional view taken along line B-B of the filter shown in FIG. 5(a).

Although not shown in FIG. 5, a sealing material layer may be formed on the circumference of the porous ceramics block 35 in the same manner as the filter 10 shown in FIG. 3.

The filter 30 has the same structure as the aggregate-type filter 10, except that the porous ceramics block 35 has an integral structure manufactured through a sintering process; thus, exhaust gases, entered the large-capacity through hole 31a, are allowed to flow out of the small-capacity through hole 31b after having passed through the wall portion 33 separating the through holes 31 from each other. Therefore, the integrated-type filter 30 also provides the same effects as the aggregate-type filter.

Moreover, in the same manner as the aggregate-type filter 10, the integrated-type filter 30 may also have any optional shape and size, and the porosity thereof is desirably set in a range from 20 to 80% in the same manner as the aggregate-type filter, with its pore diameter being desirably set to about 1 to 100 μm.

The porous ceramics constituting the porous ceramics block 35 is not particularly limited, and examples thereof include nitride, carbide and oxide ceramics in the same manner as the aggregate-type filter. Oxide ceramics such as cordierite are normally used. These materials make it possible to carry out the manufacturing processes at low costs and, since these have a comparatively low thermal expansion coefficient, the filter is less susceptible to damages due to a thermal stress during the manufacturing processes and use.

Desirably, the sealing member 32 in the integrated-type filter 30 of this type is also made from porous ceramics. The material of the sealing member 32 is not particularly limited, and examples there of may include the same material as the ceramics material constituting the porous ceramics 35.

In the filter of the present invention having the structures shown in FIGS. 3, 5(a) and 5(b), the shape of cross-sections perpendicular to the length direction of the large-capacity through holes and/or small-capacity through holes is desirably designed as a polygonal shape.

Presumably, the structure having a polygonal shape makes it possible to provide either of the following two effects: an effect of eliminating a portion that is subjected to great friction due to the shape of the through hole upon passage of exhaust gases through the large-capacity through hole and/or small-capacity through hole to reduce friction exerted upon passage through the through hole (①-1: $\Delta P_{b-1}$, ②-2: $\Delta P_{b-2}$); or an effect of eliminating a portion of the partition wall having irregularities in thickness, that is, a portion that makes exhaust gases locally difficult to pass through, with a result of reducing a pressure loss due to resistance exerted upon passage through the partition wall: $\Delta P_c$.

In particular, the shape is more desirably prepared as a polygonal shape with four or more apexes, and at least one apex desirably has an obtuse angle. With this arrangement, it becomes possible to reduce a pressure loss caused by friction exerted upon passage through the inlet side of the through hole and friction to be exerted upon passage through the outlet side of the through hole (②-1: $\Delta P_{b-1}$+②-2: $\Delta P_{b-2}$).

More specifically, a combined shape of an octagonal shape and a square shape is more desirably used.

The large-capacity through hole and/or small-capacity through hole are desirably provided with cross-sections, each of which has a curved shape in the vicinity of each of the corners. Since, if such a curved shape is provided therein, it becomes possible to further reduce pressure losses caused by friction exerted upon passage through the inlet side of the through hole and friction exerted upon passage through the outlet side of the through hole (②-1: $\Delta P_{b-1}$+②-2: $\Delta P_{b-2}$). Moreover, it also becomes possible to prevent the generation of cracks caused by concentrated stress at corner portions.

Here, in the present specification, "the distance between centers of gravity of the above-mentioned cross-sections of the adjacently located above-mentioned large-capacity through holes" refers to a minimum distance between the center of gravity of a cross-section perpendicular to the length direction of a large-capacity through hole and the center of gravity of a cross-section perpendicular to the length direction of the adjacent large-capacity through hole. In contrast, "the distance between centers of gravity of the above-mentioned cross-sections of the adjacently located above-mentioned small-capacity through holes" refers to a minimum distance between the center of gravity of a cross-section perpendicular to the length direction of a small-capacity through hole and the center of gravity of the adjacent small-capacity through hole.

In the case where the above-mentioned two center-of-gravity distances are made equal to each other, heat is evenly dispersed upon recovery, so that local deviations in temperature in the filter are eliminated; thus, it becomes possible to provide a filter that is less susceptible to cracks due to thermal stress even after repetitive uses for along period, and is superior in durability.

FIGS. 6(a) to 6(d) and FIGS. 12(a) to 12(f) are cross-sectional views that schematically show one portion of the cross section of each of the porous ceramics members constituting an aggregate-type filter in accordance with the present invention, and FIG. 6(e) is a cross-sectional view that schematically shows a part of the cross section of a conventional filter. Here, the shape of the cross section of each of the large-capacity through hole and small-capacity through hole in an integrated-type filter has the same combination; therefore, the following description will discuss the cross-sectional shapes of the large-capacity through hole and the small-capacity through hole in the filter of the present invention with reference to these figures.

In FIG. 6(a), the above-mentioned aperture ratio is set to almost 1.55, in FIG. 6(b), it is set to almost 2.54, in FIG. 6(c), it is set to almost 4.45, and in FIG. 6(d), it is set to almost 6.00. Moreover, in FIGS. 12(a), 12(c) and 12(e), the aperture ratios are all set to almost 4.45, and in FIGS. 12(b), 12(d) and 12(f), the aperture ratios are all set to almost 6.00. In all FIGS. 6(a) to 6(d), the shape of the cross section of the large-capacity through hole is an octagonal shape, and the shape of the cross section of the small-capacity through hole is a square shape. These through holes are alternately arranged, so that the aperture ratio is desirably varied optionally by changing the cross-sectional area of the small-capacity through hole with the cross-sectional shape of the large-capacity through hole being slightly varied. With respect to the filter shown in FIG. 12, the aperture ratio can be varied optionally in the same manner.

As described above, the combination of an octagonal shape and square shape provides a superior symmetrical property. Since this shape has the superior symmetrical property, exhaust gases are allowed to flow into the large-capacity through hole uniformly. Further, it becomes possible to improve the isostatic strength, compression strength and the like.

For example, the following description discusses the compression strength of the A axis. The compression strength of the A axis is calculated as follows. That is: In a honeycomb shape, a three-dimensional structure containing at least two planes perpendicular to the through hole (more preferably, a rectangular parallelepiped with the rest four planes being cut in parallel with each other or a cubic shape) is cut out, and this is placed with the through hole being set perpendicular to the base, and load pressures are applied from above in a sandwiched manner, so that the strength is calculated based upon the load at the time of breakage.

In the case where all the shapes of the cross-sectional areas are the square shape as shown in the conventional technique, all the loads are applied onto the A axis with the same pressure.

Here, in the case where the shapes include the octagonal shape and the quadrangle shape, the compressing force is dispersed into a force for expanding the octagonal shape, a force for squashing the quadrangle shape and other forces, and with respect to the wall shared by adjacently located large-capacity through holes, these forces are cancelled with one another; thus, the compressing force is presumably increased.

In the same manner, with respect to the isostatic strength also, in comparison with the case where all the cross-sectional areas have the square shape, since beams are also formed in diagonal directions, it becomes possible to easily improve the strength in the same manner. Here, the isostatic strength is also referred to as the isotropic pressure fracture strength, and an isotropic pressure, such as hydrostatic pressure, is applied to the filter, and means the strength which is calculated based upon the pressure at the time of breakage.

The isostatic strength is preferably set to 7 MPa or more, more preferably 9 MPa or more. Also, the compressing strength of the A axis is preferably set to 18 MPa or more, more preferably 25 MPa or more.

Moreover, researches by the present inventors have revealed that the above-mentioned effects are efficiently exerted in certain ranges of numeric values.

Presumably, the stability on strength and various factors, such as gas flow and thermal transmission, are incorporated with one another to form a honeycomb filter having superior durability with respect to recovery processes of particulates.

Also, with respect to the honeycomb structure in the filter of the present invention, the cross-sectional area thereof is desirably unchanged from the inlet side toward the outlet side. The reason for this is because, for example, under the compressing strength as described above, changing the cross-sectional area of the through hole causes a reduction in the compressing strength, and subsequent difficulty in manufacturing processes through extrusion molding.

In the case of filters 160 and 260 shown in FIGS. 12(a) and 12(b), each of the cross sections of the large-capacity through holes 161a and 261a has a pentagonal shape with three angles thereof being set to almost right angles, and each of the cross sections of the small-capacity through holes 161b and 261b has a quadrangle shape that occupies each of portions that diagonally face each other in a larger quadrangle shape. Moreover, filters 170 and 270 shown in FIGS. 12(c) and 12(d) have reformed cross-sectional shapes of those shown in FIGS. 6(a) to 6(d) in which a part of the partition wall, shared by the large-capacity through holes 171a and 271a as well as by the small-capacity through holes 171b and 271b, is expanded toward the small-capacity through hole side with a certain curvature. This curvature may be optionally set.

In this case, for example, curved line that constitutes a part of the partition wall, shared by the large-capacity through holes 171a and 271a as well as by the small-capacity through holes 171b and 271b, corresponds to a ¼ of the circles. Here, the shape which sets the aperture ratio to a minimum value is given by a shape as shown in FIG. 12(c), and the aperture ratio at this time is almost 3.66.

In filters 180 and 280 shown in FIGS. 12(e) and 12(f), each of large-capacity through holes 181a, 281a and each of small-capacity through holes 281b, 281b are formed by quadrangle shapes (rectangular shapes), and when two large-capacity through holes and two small-capacity through holes are combined together as shown in the figures, an almost square shape is formed.

In the case where the shapes of the through holes and the alignment thereof are the same, with variations of the above-mentioned aperture ratio, the total (a) of lengths of wall portion which is shared by one large-capacity through hole and the adjacent large-capacity through hole in the cross section perpendicular to the length direction and the total (b) of lengths of wall portion which is shared by one large-capacity through hole and the adjacent small-capacity through hole in the cross section perpendicular to the length direction are mutually varied while keeping an almost constant relationship.

Therefore, for example, in the filters having shapes shown in FIGS. 6(a) to 6(d), the relationship is substantially represented by the following formula (2):

$$\beta = (\alpha + 2^{1/2})^2 - 1 \quad (2)$$

Figure 10:
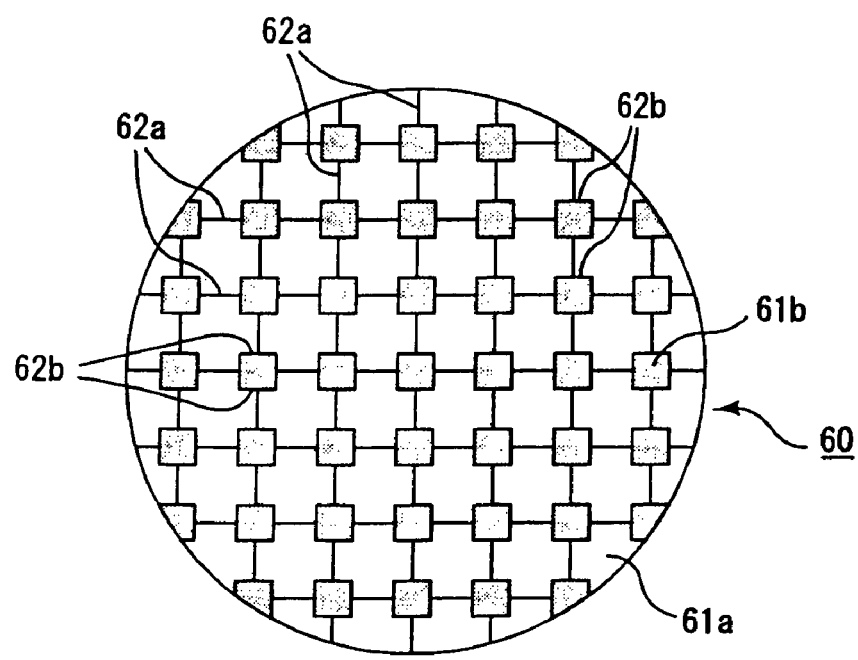
FIG. 10 is a longitudinal cross-sectional view that schematically shows another example of a conventional exhaust gas purifying honeycomb filter.
Figure 11:
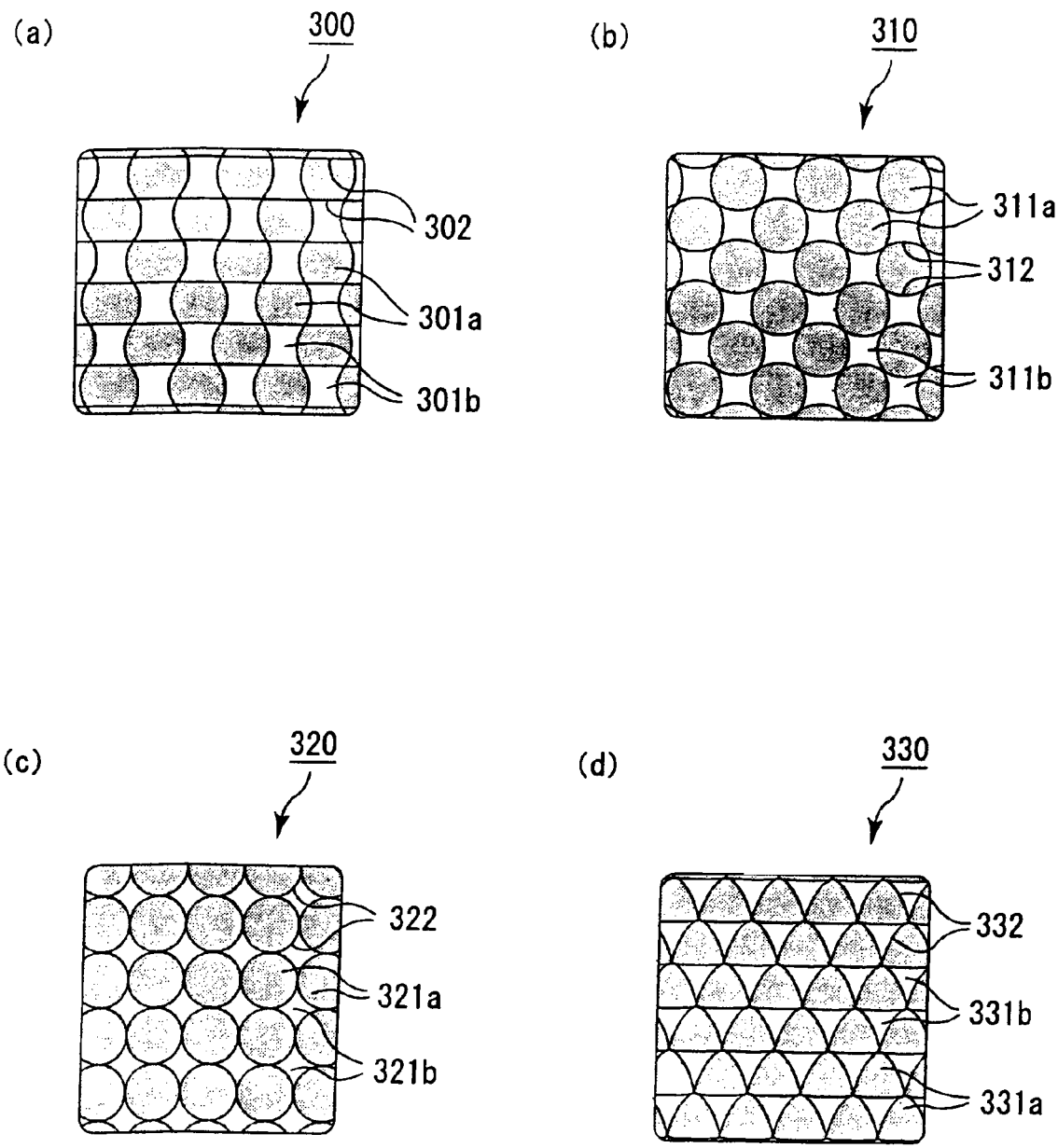
FIGS. 11(a) to 11(d) are longitudinal cross-sectional views each of which schematically shows still another example of a conventional exhaust gas purifying honeycomb filter.
Figure 12:
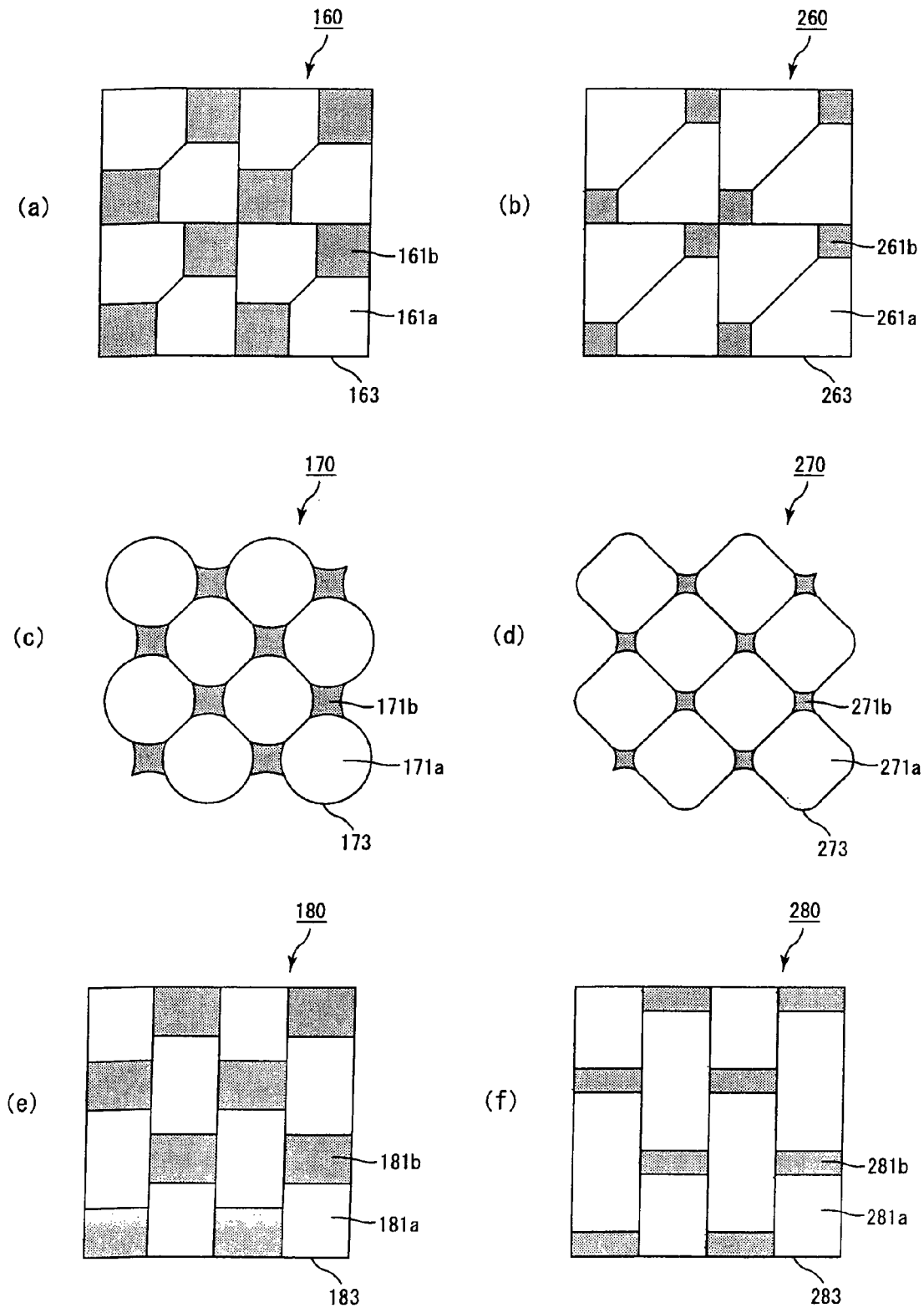
FIGS. 12(a) to 12(f) are longitudinal cross-sectional views each of which schematically shows an example of the filter of the present invention.

In the same manner, the relationship between α and β in FIG. 10 is substantially represented by the following equation (3) univocally, that in each of the cases of FIGS. 11(a) to 11(d) is represented by the following equation (4), that in each of the cases of FIGS. 12(a) and 12(b) is represented by the following equation (5), that in each of the cases of FIGS. 12(c) and 12(d) is represented by the following equation (6) and that in each of the cases of FIGS. 12(e) and 12(f) is represented by the following equation (7):

$$\beta = (\alpha + 1)^2 - 1 \quad (3)$$

$$\alpha = 0 \quad (4)$$

$$\alpha = 2\{(2 - 2^{1/2})\alpha + 1\}^2 - 1 \quad (5)$$

$$\alpha = \{\pi^2/4(4-\pi)\}(\alpha + 4/\pi)^2 - 1 \quad (6)$$

$$\beta = -(3\alpha + 2)/(\beta - 2) \quad (7)$$

In these cases, however, a (ratio the of partition wall lengths) is sometimes slightly varied by the thickness of the partition wall. For this reason, those wall portion that belong neither to the wall portion shared by one large-capacity through hole and the adjacent large-capacity through hole nor to the wall portion shared by one large-capacity through hole and the adjacent small-capacity through hole are sometimes dealt as the wall portion mutually shared by large-capacity through holes, by taking the resulting influences into consideration. Moreover, in the above-mentioned equations (2), (3), (5), (6) and (7), inequalities, $0 < \alpha \leq 1.5$ and $1 < \beta \leq 6$, hold in the same manner as equation (1).

The lower limit value of β (aperture ratio) is preferably set to 1.55, more desirably 2.0. The upper limit value of α (aperture ratio) is preferably set to 2.75, more desirably 2.54, most desirably 2.42.

By setting the aperture ratio to such values, it is possible to reduce the pressure loss exerted upon collecting particulates, and consequently to increase the recovery limit value.

Here, the recovery limit value refers to a collected amount (g/l) of particulates that might cause cracks and the like in the filter and subsequent damages to the filter, upon carrying out the recovery process, if particulates are collected beyond this value. Therefore, when the recovery limit value is increased, it becomes possible to increase the amount of particulates that can be collected until the recovery process is required, and consequently to lengthen the period up to the recovery process.

The following description will discuss one example of a manufacturing method for the filter in accordance with the present invention.

In the case where the filter of the present invention has a structure of an integrated-type filter that is entirely formed by a single sintered body, as shown in FIG. 5, first, an extrusion-molding process is carried out by using the material paste mainly composed of ceramics to manufacture a ceramics molded body having almost the same shape as the filter 30 shown in FIG. 5.

With respect to the above-mentioned material paste, although not particularly limited, those pastes which allow the porous ceramics block to have a porosity of 20 to 80% after the manufacturing processes, and, for example, those pastes prepared by adding a binder and a dispersant solution to powder made from the above-mentioned ceramics may be used.

The above-mentioned binder is not particularly limited, and examples thereof may include methyl cellulose, carboxymethyl cellulose, hydroxyethyl cellulose, polyethylene glycol, phenolic resins, epoxy resins and the like.

Normally, the blended amount of the above-mentioned binder is desirably set to 1 to 10 parts by weight with respect to 100 parts by weight of ceramics powder.

The above-mentioned dispersant solution is not particularly limited, and examples thereof may include an organic solvent such as benzene and the like, alcohol such as methanol and the like, water and the like.

An appropriate amount of the above-mentioned dispersant solution is blended so that the viscosity of the material paste is set in a predetermined range.

These ceramics powder, binder and dispersant solution are mixed by an attritor or the like, and sufficiently kneaded by a kneader or the like, and then extrusion-molded, so that the above-mentioned ceramics molded body is formed.

Moreover, a molding auxiliary may be added to the above-mentioned material paste, if necessary.

The molding auxiliary is not particularly limited, and examples thereof may include ethylene glycol, dextrin, fatty acid soap, polyalcohol and the like.

Further, a pore-forming agent, such as balloons that are fine hollow spheres composed of oxide-based ceramics, spherical acrylic particles and graphite, may be added to the above-mentioned material paste, if necessary.

The above-mentioned balloons are not particularly limited, and examples thereof may include alumina balloons, glass micro-balloons, shirasu balloons, fly ash balloons (FA balloons), mullite balloons and the like. In particular, fly ash balloons are desirably used.

Further, after the above-mentioned ceramic compact has been dried by using a drier such as a microwave drier, a hot-air drier, a dielectric drier, a reduced-pressure drier, a vacuum drier and a frozen drier, predetermined through holes are filled with sealing material paste to form sealing members, so that a mouth-sealing process for plugging the through holes is carried out.

With respect to the above-mentioned sealing material paste, although not particularly limited, those pastes which allow the sealing members to be formed through post processing to have a porosity of 20 to 80%, and, for example, those pastes, prepared by adding a lubricant, a solvent, a binder and a dispersant solution to ceramics powder used as the above-mentioned material paste, are desirably used. With this arrangement, it becomes possible to prevent ceramics particles in the sealing material paste from settling during the sealing process.

Next, the ceramics dried body which has been filled with the sealing material paste is subjected to degreasing and firing processes under predetermined conditions so that a filter, made from porous ceramics and constituted by a sintered body in its entire structure, can be manufactured.

Here, with respect to the degreasing and sintering conditions and the like of the ceramics dried body, it is possible to apply conditions that have been conventionally used for manufacturing filters made from porous ceramics.

Figure 4:
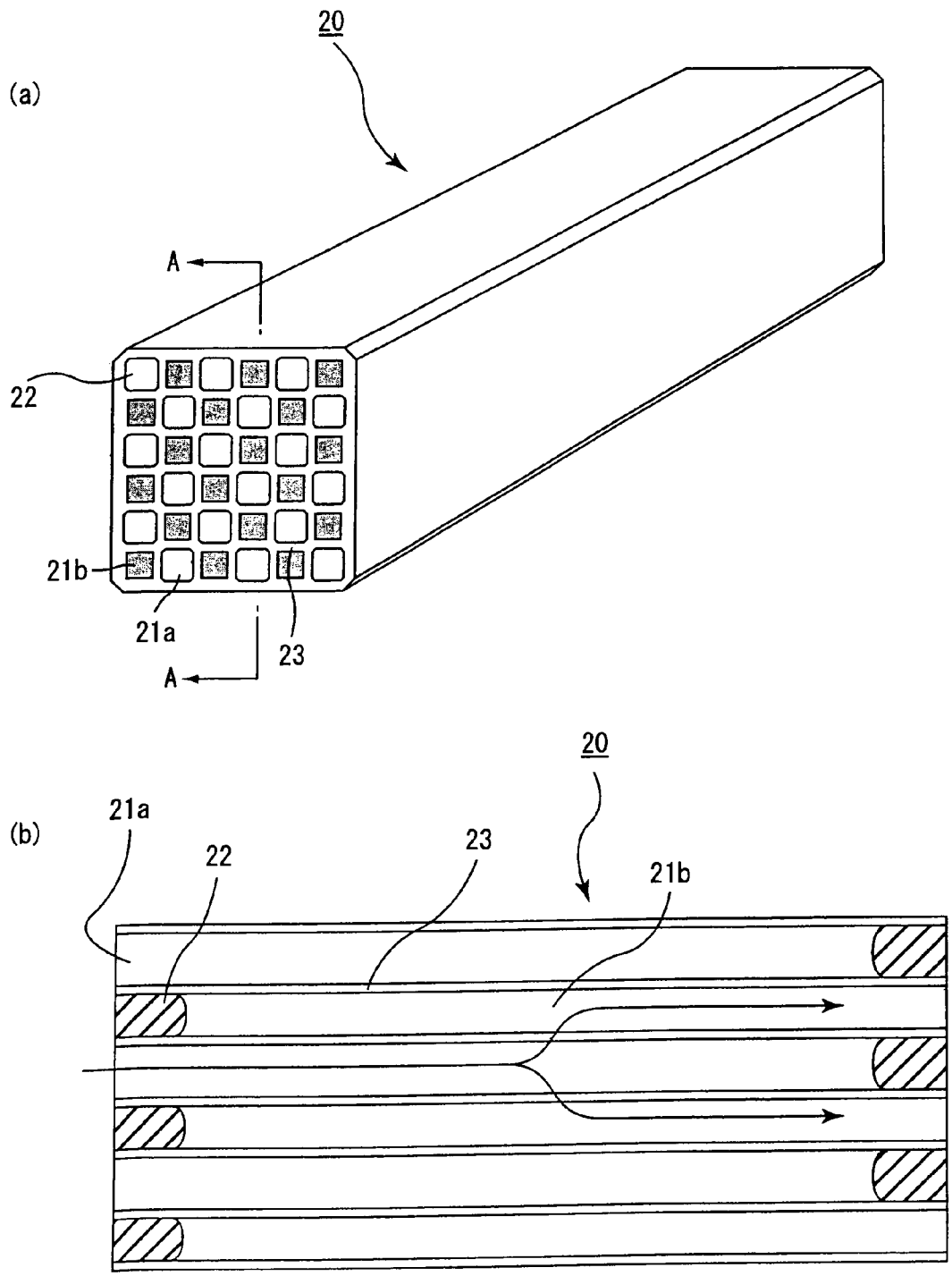
FIG. 4(a) is a perspective view that schematically shows one example of a porous ceramics member forming the filter shown in FIG. 3.
FIG. 4(b) is a cross-sectional view taken along line A-A of the porous ceramics member shown in FIG. 4(a).

Moreover, in the case where, as shown in FIG. 3, the filter of the present invention is prepared as an aggregate-type filter constituted by a plurality of porous ceramics members combined with one another through sealing material layers, first, the above-mentioned material paste mainly composed of ceramics is extrusion-molded to form a raw molded body having a shape corresponding to a porous ceramics member 20 shown in FIG. 4.

Here, with respect to the material paste, the same material paste as explained in the above-mentioned aggregate-type filter may be used.

Further, after the above-mentioned raw molded body has been dried by using a microwave drier or the like to form a dried product, predetermined through holes of the dried product are filled with sealing material paste to form sealing members, so that a mouth-sealing process for plugging the through holes is carried out.

With respect to the above-mentioned sealing material paste, the same sealing material paste as explained in the above-mentioned integrated-type filter may be used, and the above-mentioned mouth-sealing process may be carried out by using the same method as explained in the above-mentioned integrated-type filter may be used except the case that the target to be filled with the sealing material paste is different.

Next, the dried product which has been subjected to the above-mentioned mouth-sealing process is subjected to degreasing and sintering processes under predetermined conditions so that a porous ceramics member in which a plurality of through holes are placed in parallel with one another in the length direction with a partition wall being interposed therebetween is manufactured.

Here, with respect to the degreasing and sintering conditions and the like of the raw molded body, it is possible to apply conditions and the like that have been conventionally used for manufacturing the filter made from a plurality of porous ceramics members that are combined through sealing material layers.

Figure 7:
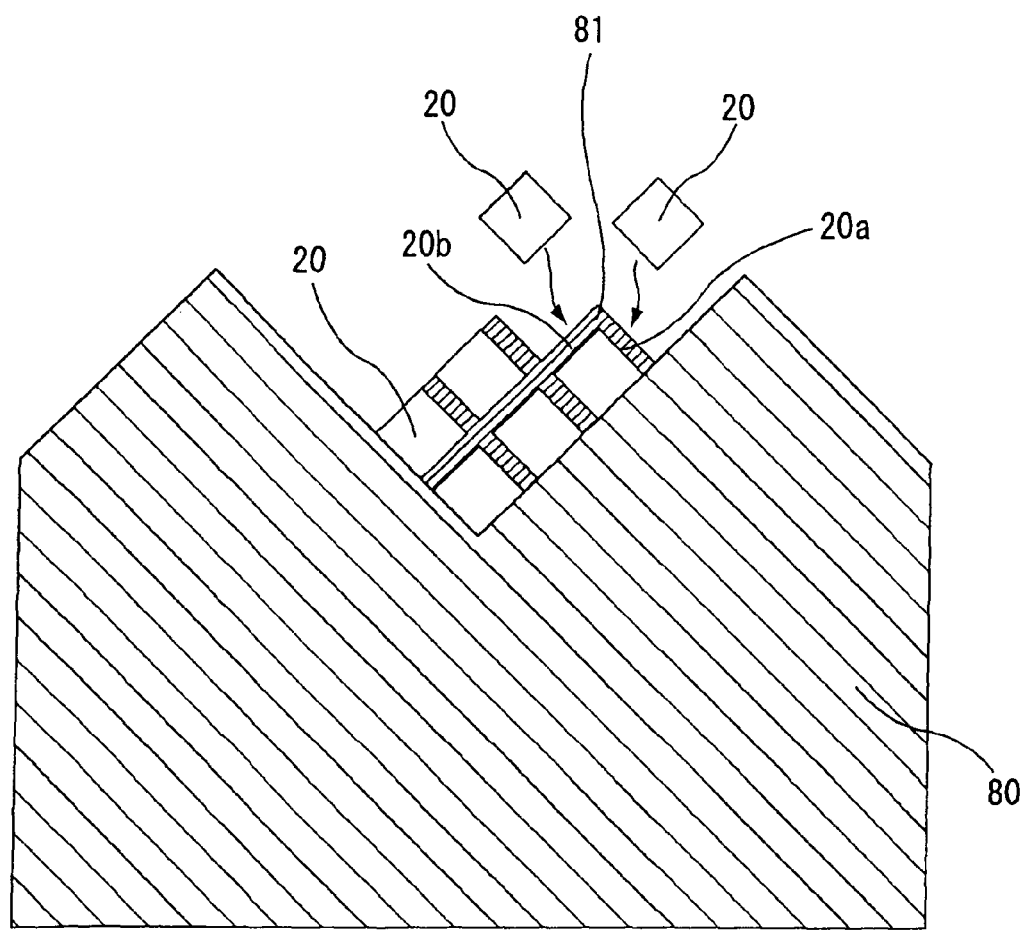
FIG. 7 is a side view that schematically shows a state of one process carried out for manufacturing a honeycomb filter of the present invention.

Next, as shown in FIG. 7, after porous ceramics members 20 have been placed in a tilted manner on a base 80 the upper portion of which is designed to have a V-letter shape in its cross-section so as to allow the porous ceramics members 20 to be stacked thereon in a tilted manner, sealing material paste to form the sealing material layer 14 is applied onto two side faces 20a and 20b facing upward with an even thickness to form a sealing material paste layer 81; thereafter, a laminating process for forming another porous ceramics member 20 on this sealing material paste layer 81 is successively repeated, so that a laminated body of the porous ceramic members 20 having a predetermined size and a square-column shape is manufactured.

With respect to the material for forming the above-mentioned sealing material paste, since the explanation thereof has already been given in the filter of the present invention, the description thereof will not be given.

Next, this laminated body of the porous ceramics member 20 is heated, so that the sealing material paste layer 81 is dried and solidified to form a sealing material layer 14. The circumferential face of this is then cut into a shape as shown in FIG. 3 by using, for example, a diamond cutter or the like; thus, a ceramics block 15 is manufactured.

Further, a sealing material layer 13 is formed on the circumference of the ceramics block 15 by using the above-mentioned sealing material paste, so that a filter, formed by combining a plurality of porous ceramics members with one another through sealing material layers, can be manufactured.

Each of the filters manufactured in this method has a column shape and its structure is shown in FIGS. 3 and 5.

With respect to the application of the filter of the present invention, although not particularly limited, it is desirably used for exhaust gas purifying apparatuses for use in vehicles.

Figure 8:
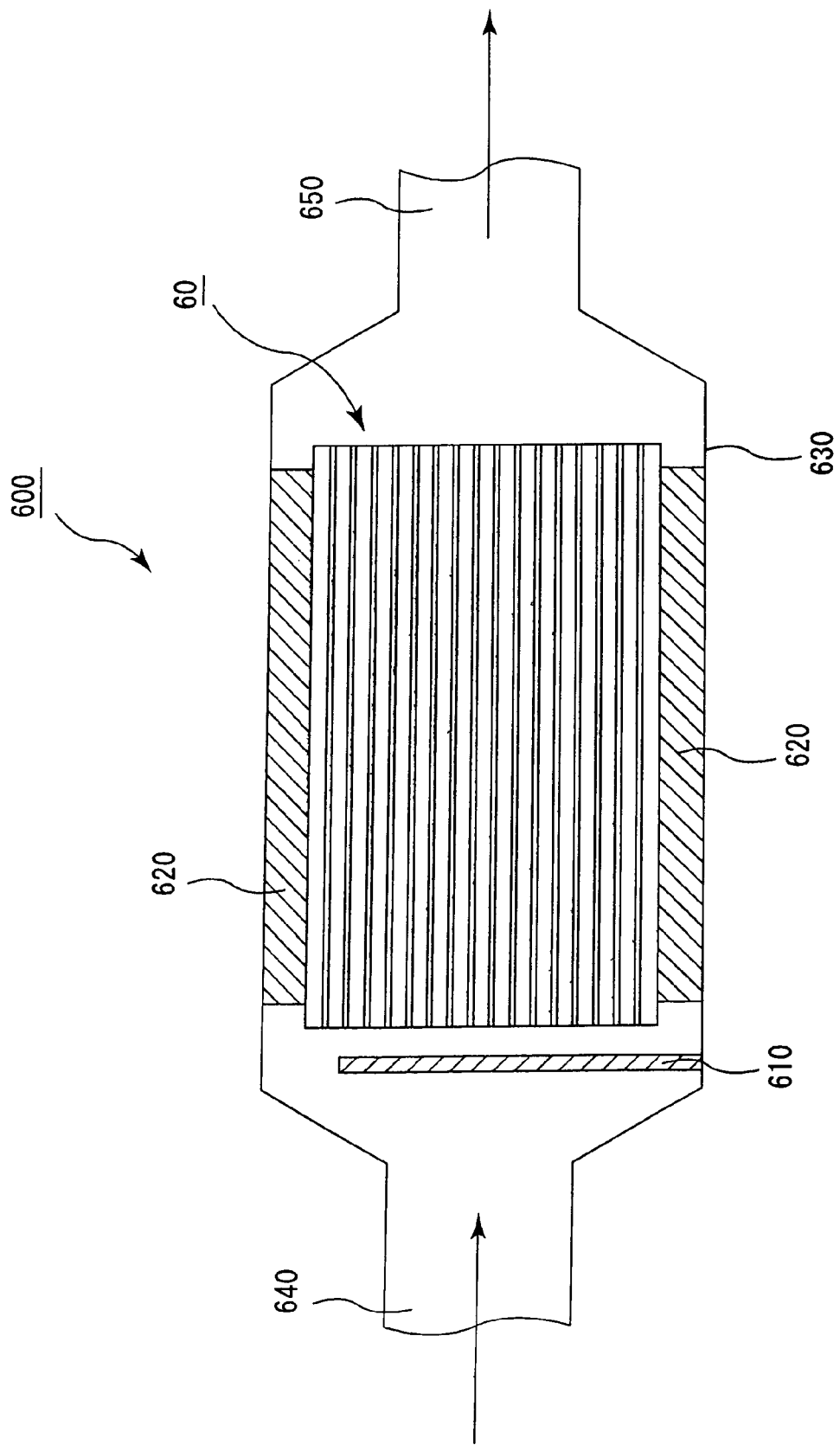
FIG. 8 is a cross-sectional view that schematically shows an example of an exhaust gas purifying apparatus in which the exhaust gas purifying honeycomb filter of the present invention is used.

FIG. 8 is a cross-sectional view that schematically shows one example of an exhaust gas purifying apparatus for use in vehicles, which is provided with the filter of the present invention.

As shown in FIG. 8, an exhaust gas purifying apparatus 600 is mainly constituted by a filter 60 of the present invention, a casing 630 that covers the external portion of the filter 60, a holding sealing member 620 placed between the filter 60 and the casing 630, and heating means 610 placed on the exhaust gas inlet side of the filter 60, and an introducing pipe 640, which is connected to an internal combustion device such as an engine, is connected to one end of the casing 630 on the exhaust-gas inlet side, and a discharging pipe 650 externally coupled is connected to the other end of the casing 630. In FIG. 8, arrows show flows of exhaust gases.

Moreover, in FIG. 8, the filter 60 may be the filter 10 shown in FIG. 3 or the filter 30 shown in FIGS. 5(a) and 5(b).

In the exhaust gas purifying apparatus 600 having the above-mentioned arrangement, exhaust gases, discharged from the internal combustion device such as an engine, are directed into the casing 630 through the introducing pipe 640, and allowed to flow from the through holes of the filter 60 to pass through the wall portion (the partition wall) to be purified, with particulates thereof being collected in the wall portion (the partition wall), and are then discharged outside through the exhaust pipe 650.

After a great amount of particulates have been accumulated on the wall portion (the partition wall) of the filter 60 to cause an increase in pressure losses, the filter 60 is subjected to a recovery process.

In the recovery process, a gas, heated by using the heating means 610, is allowed to flow into the through holes of the filter 60, so that the filter 60 is heated to burn and eliminate the particulates deposited on the wall portion (the partition wall).

Moreover, the particulates may be burned and eliminated by using a post-injection system.

Moreover, the pores of the filter of the present invention may carry a catalyst capable of purifying CO, HC, NOx and the like in the exhaust gases.

When such a catalyst is carried thereon, the filter of the present invention is allowed to function as a filter capable of collecting particulates in exhaust gases and, also, to function as a catalyst converter for purifying CO, HC, NOx and the like contained in exhaust gases.

The above-mentioned catalyst may be carried on the surface of each of particles constituting the honeycomb structural body of the present invention with the pores remaining thereon, or may be carried on the wall portion with a certain thickness. Moreover, the above-mentioned catalyst may be evenly carried on the surfaces of the wall portion of the through holes, or may be carried on a specific place in a biased manner. In particular, when the catalyst is carried on the surfaces of the wall portion of the inlet-side through holes or on the surface of each of particles in the vicinity of the surfaces, or on both of these portions, the catalyst is easily made in contact with the particulates, so that the particulates can be efficiently burned.

Examples of the catalyst may include noble metals such as platinum, palladium, rhodium and the like. The catalyst, made from these noble metals, is a so-called three-way catalyst, and the filter of the present invention on which such a three-way catalyst is carried is allowed to function in the same manner as conventionally known catalyst converters. Therefore, with respect to the case where the filter of the present invention also functions as a catalyst converter, detailed description thereof will not be given.

Here, with respect to the catalyst to be carried on the filter of the present invention, not particularly limited to the above-mentioned noble metals, any catalyst may be used as long as it can purify CO, HC and NOx in exhaust gases.

BEST MODE FOR CARRYING OUT THE INVENTION

The following description will discuss the present invention in detail by means of examples; however, the present invention is not intended to be limited by these examples.

Example 1

(1) Powder of α-type silicon carbide having an average particle size of 11 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a mixed composition. Next, after a slight amount of a plasticizer and a lubricant have been added and kneaded therein, the resulting mixture was extrusion-molded, so that a raw molded body, which had an octagonal cross-sectional shape in the large-capacity through hole and an quadrangle cross-sectional shape (substantially square shape) in the small-capacity through hole, with β (aperture ratio) after the sintering process being set to 1.50, was manufactured as shown in FIGS. 6(a) to 6(d).

Next, the above-mentioned raw molded body was dried by using a micro-wave drier or the like to form a ceramics dried body, and predetermined through holes were then filled with a sealing material paste having the same composition as the raw molded body. After having been again dried by using a drier, this was degreased at 400° C., and sintered at 2200° C. in a normal-pressure argon atmosphere for 3 hours to manufacture a porous ceramics member 20, which was a silicon carbide sintered body, and had a porosity of 42%, an average pore diameter of 9 μm, a size of 34.3 mm×34.3 mm×150 mm and the number of through holes of 28/cm$^2$ (10 mm×10 mm) (large-capacity through holes: 14 pcs/cm$^2$ small-capacity through holes: 14 pcs/cm$^2$), with substantially all the wall portion 23 being set to have a thickness of 0.4 mm.

Here, in the resulting porous ceramics member 20, on one of the end faces thereof, only the large-capacity through holes 21a were sealed with a sealing agent, and on the other end face, only the small-capacity through holes 21b were sealed with a sealing agent.

Moreover, with respect to the porous ceramics member 20, α (ratio of partition wall lengths) was set to 0.20.

(2) By using a heat resistant sealing material paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, the processes as explained by reference to FIG. 7 were carried out so that a number of the porous silicon carbide members were combined with one another, and this was then cut by using a diamond cutter to form a cylindrical shaped ceramics block.

In this case, the thickness of the sealing material layers for combining the porous ceramics members was adjusted to 1.0 mm.

Next, ceramics fibers made from alumina silicate (shot content: 3%, fiber length: 0.1 to 100 mm) (23.3% by weight) serving as inorganic fibers, silicon carbide powder having an average particle size of 0.3 μm (30.2% by weight) serving as inorganic particles, silica sol (SiO$_2$ content in the sol: 30% by weight) (7% by weight) serving as an inorganic binder, carboxymethyl cellulose (0.5% by weight) serving an organic binder, and water (39% by weight) were mixed and kneaded to prepare a sealing material paste.

Next, a sealing material paste layer having a thickness of 0.2 mm was formed on the circumferential portion of the ceramics block by using the above-mentioned sealing material paste. Further, this sealing material paste layer was dried at 120° C., so that a cylinder-shaped filter having a diameter of 144 mm was manufactured.

Examples 2 to 24 and Comparative Examples 1 and 2

(1) The same processes as (1) of Example 1 were carried out except that the porous ceramics member had an octagonal cross-sectional shape in the large-capacity through hole and a quadrangle cross-sectional shape (substantially square shape) in the small-capacity through hole as shown in FIGS. 6(a) to 6(d), with β (aperture ratio) and α (ratio of partition wall lengths) being respectively set to values shown in Table 1; thus, a porous ceramics member was manufactured.

(2) A filter was manufactured by using the same processes as (2) of Example 1, except that each of the porous ceramics members manufactured in the above-mentioned (1) was used.

Examples 25 to 31 and Comparative Examples 3 and 4

(1) The same processes as (1) of Example 1 were carried out except that the porous ceramics member had a pentagonal cross-sectional shape in the large-capacity through hole and an quadrangle cross-sectional shape (substantially square shape) in the small-capacity through hole as shown in FIGS. 12(a) and 12(b), with β (aperture ratio) and α (ratio of partition wall lengths) being respectively set to values shown in Table 1; thus, a porous ceramics member was manufactured.

(2) A filter was manufactured by using the same processes as (2) of Example 1, except that each of the porous ceramics members manufactured in the above-mentioned (1) was used.

Examples 32 to 35 and Comparative Examples 5 and 6

(1) The same processes as (1) of Example 1 were carried out except that the porous ceramics member had an octagonal cross-sectional shape in the large-capacity through hole with four corners thereof being expanded with a certain curvature and a quadrangle cross-sectional shape (substantially square shape) in the small-capacity through hole with four corners thereof being shrunk with a certain curvature, as shown in FIGS. 12(c) and 12(d), with β (aperture ratio) and α (ratio of partition wall lengths) being respectively set to values shown in Table 1; thus, a porous ceramics member was manufactured.

(2) A filter was manufactured by using the same processes as (2) of Example 1, except that each of the porous ceramics members manufactured in the above-mentioned (1) was used.

Examples 36 to 44 and Comparative Examples 7 and 8

(1) The same processes as (1) of Example 1 were carried out except that the porous ceramics member had a rectangular cross-sectional shape in the large-capacity through hole and a rectangular cross-sectional shape (square shape depending on cases) in the small-capacity through hole, as shown in FIGS. 12(e) and 12(f), with β (aperture ratio) and α (ratio of partition wall lengths) being respectively set to values shown in Table 1; thus, a porous ceramics member was manufactured.

(2) A filter was manufactured by using the same processes as (2) of Example 1, except that each of the porous ceramics members manufactured in the above-mentioned (1) was used.

Comparative Examples 9 to 19

(1) The same processes as (1) of Example 1 were carried out except that the porous ceramics member had substantially the same cross-sectional shapes (polygonal shape with twelve apexes and quadrangle shape) as the cross-sectional shape shown in FIG. 10, with β (aperture ratio) and α (ratio of partition wall lengths) being respectively set to values shown in Table 1; thus, a porous ceramics member was manufactured.

(2) A filter was manufactured by using the same processes as (2) of Example 1, except that each of the porous ceramics members manufactured in the above-mentioned (1) was used.

Comparative Examples 20 to 27

(1) The same processes as (1) of Example 1 were carried out except that the porous ceramics member had substantially the same cross-sectional shapes as those shown in FIG. 11(a) (Comparative Example 20), shown in FIG. 11(b) (Comparative Examples 21 and 22), shown in FIG. 11(c) (Comparative Examples 23 to 25) and shown in FIG. 11(d) (Comparative Examples 26 and 27), with β (aperture ratio) and α (ratio of partition wall lengths) being respectively set to values (α=0) shown in Table 1; thus, a porous ceramics member was manufactured.

(2) A filter was manufactured by using the same processes as (2) of Example 1, except that each of the porous ceramics members manufactured in the above-mentioned (1) was used.

Comparative Examples 28 and 29

(1) The same processes as (1) of Example 1 were carried out except that the porous ceramics member had substantially the same cross-sectional shapes as those shown in FIG. 6(e) (all of which are square shapes with sealed through holes in a diced pattern), with β (aperture ratio)=1 and α (ratio of partition wall lengths) being set to a value (α=0) shown in Table 1; thus, a porous ceramics member was manufactured.

(2) A filter was manufactured by using the same processes as (2) of Example 1, except that each of the porous ceramics members manufactured in the above-mentioned (1) was used.

Comparative Examples 30 to 33

Figure 20:
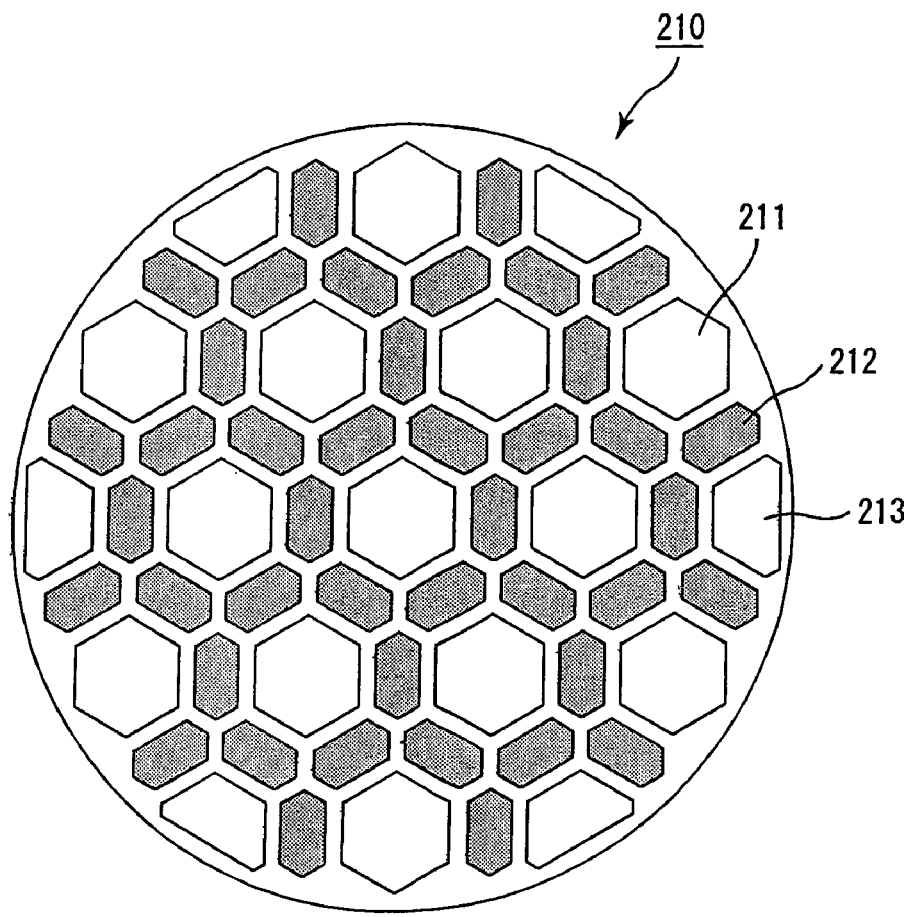
FIG. 20 is a cross-sectional view that schematically shows a cross section perpendicular to the length direction of a conventional honeycomb structural body.
Figure 21:
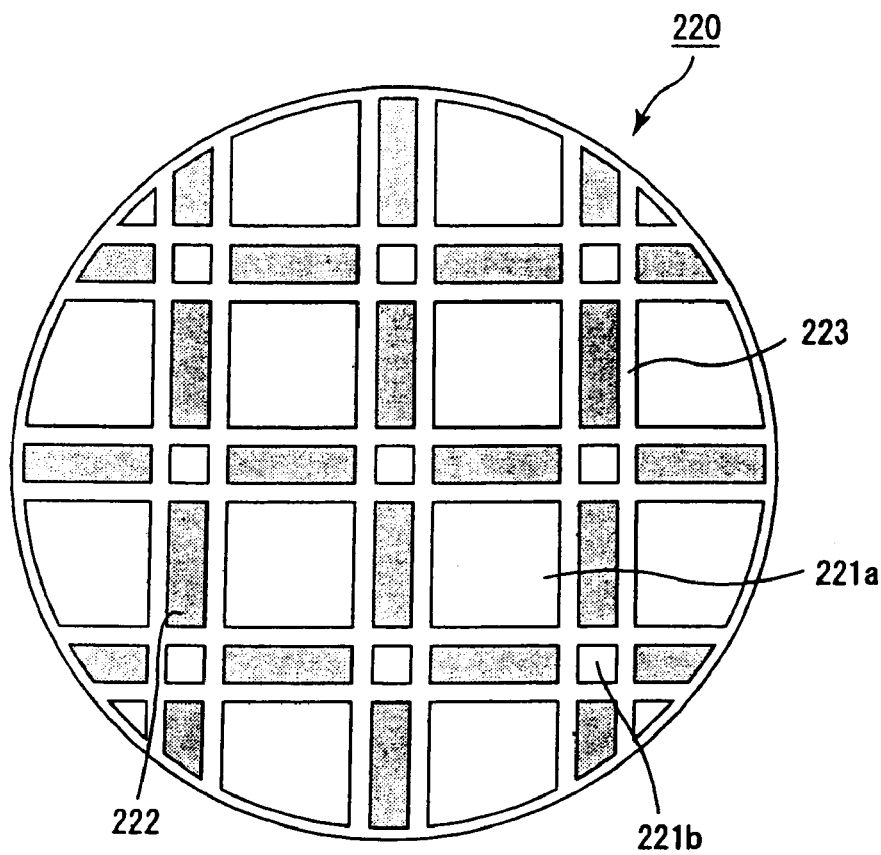
FIG. 21 is a cross-sectional view that schematically shows a cross section perpendicular to the length direction of a conventional honeycomb structural body.
Figure 22:
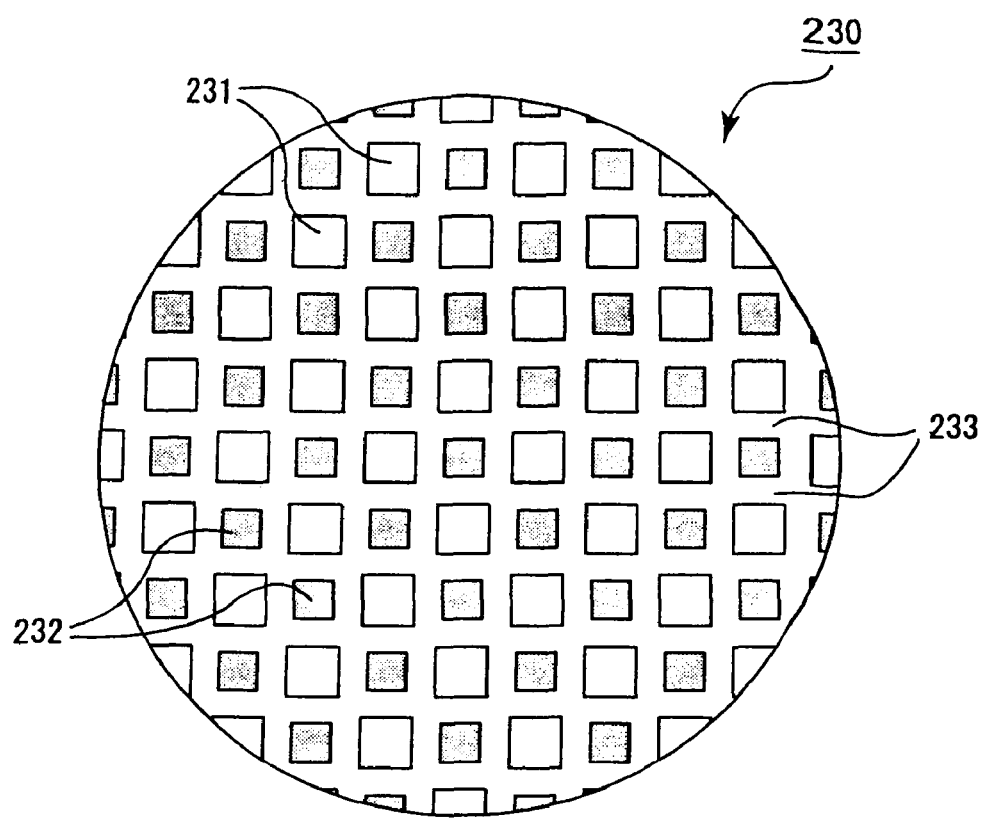
FIG. 22 is a cross-sectional view that schematically shows a cross section perpendicular to the length direction of a conventional honeycomb structural body.

(1) The same processes as (1) of Example 1 were carried out except that the porous ceramics members had substantially the same cross-sectional shapes as those shown in FIG. 19 (Comparative Example 30), shown in FIG. 20 (Comparative Example 31), shown in FIG. 21 (Comparative Examples 32) and shown in FIG. 22 (Comparative Example 33); thus, a porous ceramics member was manufactured. Here, in the cross-sectional shape of a filter 200 (FIG. 19) shown in Comparative Example 30, the numbers of the large-capacity through holes (hexagonal shape) and the small-capacity through holes (triangle shape) were substantially set to 1:2. Moreover, the cross section of a filter 220 (FIG. 21) shown in Comparative Example 32 has a lattice pattern in which through holes 221a having a large square shape, through holes 221b having a small square shape and through holes 222 having a rectangular shape are combined together, and the cross section of a filter 230 (FIG. 22) shown in Comparative Example 33 has a structure in that square through holes 231 and through holes 232 having a square shape slightly smaller than this square shape are alternately combined with one another.

(2) A filter was manufactured by using the same processes as (2) of Example 1, except that each of the porous ceramics members manufactured in the above-mentioned (1) was used.

Comparative Example 34

(1) The same processes as (1) of Example 1 were carried out to manufacture a porous ceramics member except that the shape of the cross section in parallel with the length direction of the though holes was formed into a tapered shape.

(2) A filter was manufactured by using the same processes as (2) of Example 1, except that each of the porous ceramics members manufactured in the above-mentioned (1) was used.

The area of the cross section perpendicular to the length direction of the through holes of the resulting filter is made gradually larger or made gradually smaller, and when explained with reference to FIG. 6(a), the large-capacity through hole 21a on the exhaust-gas inlet side is narrowed to the small-capacity through hole 21b on the exhaust-gas outlet side, while the small-capacity through hole 21b on the exhaust-gas inlet side is expanded to the large-capacity through hole 21a on the exhaust-gas outlet side.

(Evaluation Method)

(1) Variation in Pressure Loss

As shown in FIG. 8, each of the filters according to the respective examples and comparative examples was installed in an exhaust passage of an engine to form an exhaust gas purifying apparatus, and the engine was driven at the number of revolutions of 3000 min$^{-1}$ and a torque of 50 Nm; thus, measurements were carried out to find the initial (prior to the driving) pressure loss and the pressure loss after collection of a predetermined amount of particulates. Tables 1 to 3 show cross-sectional shapes, β (aperture ratio), α (ratio of partition wall lengths), a value of (20/9) α$^2$+1, the initial pressure loss at the corresponding time, and data of pressure loss at the time of each of particulate collections of 0.5, 4.0, 6.0 and 8.0 (g/L)

(2) Measurement of Recovery Limit Value

As shown in FIG. 8, each of filters according to the examples and comparative examples was installed in an exhaust passage of an engine to form an exhaust gas purifying apparatus, and the engine was driven at the number of revolutions of 3000 min$^{-1}$ and a torque of 50 Nm for a predetermined period of time and the recovery process was then successively carried out, and the above-mentioned test processes were continuously carried out while the driving time was increased, so that the filter was examined for occurrence of any cracks. These experiments were carried out on five filters according to each of the examples and comparative examples. Then, the amount of particulates that had been collected up to the occurrence of any cracks was measured, and the average value of the five samples is determined as a recovery limit value. The results of the tests are shown in the following Tables 1 to 3.

Figure 13:
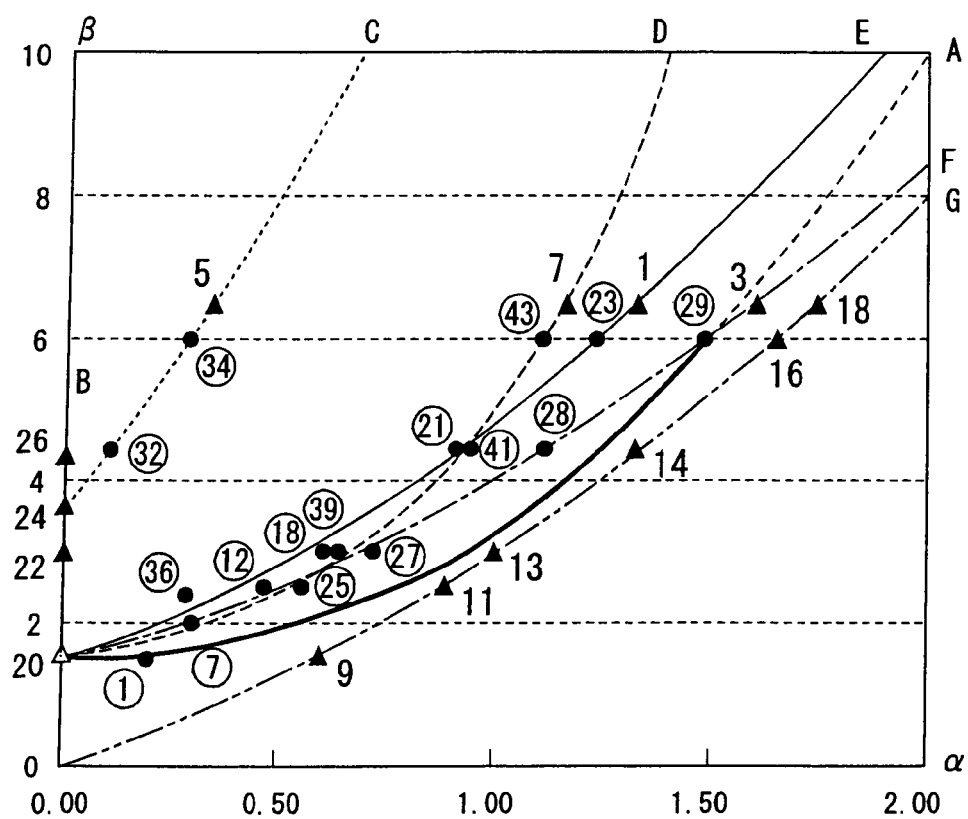
FIG. 13 is a graph that shows the relationship between a (ratio of the partition wall lengths) and β (aperture ratio) of each of filters according to examples and comparative examples.

FIG. 13 is a graph that shows the relationship between the values of β (aperture ratio) and α (ratio of partition wall lengths) in Examples 1 to 44 and Comparative Examples 1 to 33. With respect to points in FIG. 13 which are selected from the above-mentioned examples and comparative examples, those numbers enclosed by circles (for example, (16), (17), (18) . . . ) indicate example numbers, and those represented only by numbers (for example, 1, 10, 20 . . . ) indicate comparative example numbers. Moreover, line A indicates β=(20/9) α$^2$+1. Further, line B indicates the relationship between α and β in the filter having a cross-sectional shape indicated by FIG. 11, and curves C to G respectively indicate the relationship between α and β in each of the filters having cross-sectional shapes indicated by FIGS. 12(c) and 12(d), FIGS. 12(e) and 12(f), FIG. 6(a), FIGS. 12(a) and 12(b) and FIG. 10.

(3) Relationship Between the Ash Weight and the Length of Ash Layer or the Pressure Loss of the Filter As shown in FIG. 8, each of filters according to the examples and comparative examples was installed in an exhaust passage of an engine to form an exhaust gas purifying apparatus, and the engine was driven at the number of revolutions of 3000 min$^{-1}$ and a torque of 50 Nm for a predetermined period of time and the recovery process was then carried out repeatedly; thus, the relationship between the length (length in the exhaust gas flowing direction) of the layer of ashes filled in the through hole forming the filter and the ash weight as well as the relationship between the pressure loss of the filter and the ash weight was obtained with respect to each of Example 2, Example 13 and Comparative Example 28. Tables 15 and 16 show the results of the measurements.

(3) Compression Strength and Isostatic Strength of Filter

Each of filters is cut into a cube having a size of about 30 mm and the compression strength of A-axis was measured by using an Instron model 5582.

Moreover, with respect to a filter having a diameter of 144 mm and a length of 150 mm, the isostatic strength was measured. Upon measurements, aluminum plates (thickness: 1 mm) were put on upper and lower portions of a sample, and this was wrapped in an urethane sheet (thickness: 1 mm) to be sealed therein; thereafter, this was put in a pressure container filled with water, and a pressure is applied thereon, so that the pressure at the time of breakage was determined as an isostatic strength.

Tables 1 to 3 also show the results of these tests.

TABLE 1

| | Cross-sectional shape | Aperture ratio (β) | Ratio of partition wall lengths (α) | (20/9) α$^2$ + 1 | Initial pressure loss (kPa) | Pressure loss (kPa) upon collection of particulates A g/L | | | | Recovery limit value (g/L) | Iso-static strength (MPa) | Compression strength (MPa) |
|---|---|---|---|---|---|---|---|---|---|---|---|---|
| | | | | | | A = 0.5 | A = 4.0 | A = 6.0 | A = 8.0 | | | |
| Example 1 | FIGS. 6(a) to 6(d) | 1.50 | 0.20 | 1.09 | 1.5 | 2.6 | 6.6 | 9.3 | 11.7 | 8.6 | 7.0 | 29.4 |
| Example 2 | FIGS. 6(a) to 6(d) | 1.55 | 0.18 | 1.07 | 1.5 | 2.6 | 6.5 | 9.0 | 11.3 | 8.6 | 7.2 | 29.4 |
| Example 3 | FIGS. 6(a) to 6(d) | 1.55 | 0.18 | 1.07 | 1.5 | 2.6 | 6.5 | 9.0 | 11.3 | 8.6 | 7.3 | 29.4 |
| Example 4 | FIGS. 6(a) to 6(d) | 1.60 | 0.20 | 1.09 | 1.5 | 2.6 | 6.5 | 9.0 | 11.3 | 8.6 | 7.5 | 29.1 |
| Example 5 | FIGS. 6(a) to 6(d) | 1.75 | 0.24 | 1.13 | 1.5 | 2.6 | 6.5 | 9.0 | 11.3 | 8.9 | 8.3 | 29.1 |
| Example 6 | FIGS. 6(a) to 6(d) | 1.92 | 0.29 | 1.19 | 1.5 | 2.6 | 6.5 | 8.9 | 11.3 | 9.0 | 8.7 | 29.1 |
| Example 7 | FIGS. 6(a) to 6(d) | 2.01 | 0.32 | 1.23 | 1.5 | 2.7 | 6.5 | 8.9 | 11.2 | 9.1 | 9.0 | 28.8 |
| Example 8 | FIGS. 6(a) to 6(d) | 2.10 | 0.35 | 1.27 | 1.6 | 2.7 | 6.5 | 8.8 | 11.2 | 9.2 | 9.1 | 28.8 |
| Example 9 | FIGS. 6(a) to 6(d) | 2.20 | 0.37 | 1.31 | 1.6 | 2.7 | 6.5 | 8.8 | 11.2 | 9.4 | 9.2 | 28.5 |

TABLE 1-continued

|  | Cross-sectional shape | Aperture ratio ($\beta$) | Ratio of partition wall lengths ($\alpha$) | (20/9) $\alpha^2 + 1$ | Initial pressure loss (kPa) | Pressure loss (kPa) upon collection of particulates Ag/L | | | | Recovery limit value (g/L) | Isostatic strength (MPa) | Compression strength (MPa) |
| --- | --- | --- | --- | --- | --- | --- | --- | --- | --- | --- | --- | --- |
|  |  |  |  |  |  | A = 0.5 | A = 4.0 | A = 6.0 | A = 8.0 |  |  |  |
| Example 10 | FIGS. 6(a) to 6(d) | 2.30 | 0.40 | 1.36 | 1.6 | 2.8 | 6.5 | 8.8 | 11.1 | 9.5 | 9.4 | 28.2 |
| Example 11 | FIGS. 6(a) to 6(d) | 2.40 | 0.43 | 1.41 | 1.6 | 2.9 | 6.5 | 8.7 | 11.1 | 9:5 | 9.4 | 28.2 |
| Example 12 | FIGS. 6(a) to 6(d) | 2.51 | 0.46 | 1.47 | 1.6 | 2.9 | 6.5 | 8.7 | 11.1 | 9.3 | 9.1 | 27.8 |
| Example 13 | FIGS. 6(a) to 6(d) | 2.54 | 0.47 | 1.49 | 1.6 | 2.9 | 6.5 | 8.7 | 11.1 | 9.3 | 9.1 | 27.8 |
| Example 14 | FIGS. 6(a) to 6(d) | 2.54 | 0.47 | 1.49 | 1.6 | 2.9 | 6.5 | 8.7 | 11.1 | 9.2 | — | — |
| Example 15 | FIGS. 6(a) to 6(d) | 2.63 | 0.49 | 1.54 | 1.7 | 3.0 | 6.6 | 8.8 | 11.1 | 9.0 | 8.8 | 27.4 |
| Example 16 | FIGS. 6(a) to 6(d) | 2.75 | 0.52 | 1.61 | 1.7 | 3.1 | 6.6 | 8.8 | 11.1 | 8.9 | 8.3 | 27.0 |
| Example 17 | FIGS. 6(a) to 6(d) | 2.88 | 0.56 | 1.69 | 1.7 | 3.1 | 6.6 | 8.8 | 11.2 | 8.8 | 8.2 | 26.7 |
| Example 18 | FIGS. 6(a) to 6(d) | 3.00 | 0.59 | 1.76 | 1.7 | 3.1 | 6.6 | 8.8 | 11.2 | 8.8 | 8.1 | 26.4 |
| Example 19 | FIGS. 6(a) to 6(d) | 3.02 | 0.59 | 1.78 | 1.8 | 3.2 | 6.9 | 9.0 | 11.2 | 8.8 | 7.9 | 26.3 |
| Example 20 | FIGS. 6(a) to 6(d) | 3.16 | 0.63 | 1.87 | 1.8 | 3.2 | 6.9 | 9.0 | 11.2 | 8.7 | 7.5 | 26.0 |
| Example 21 | FIGS. 6(a) to 6(d) | 4.45 | 0.92 | 2.88 | 2.0 | 3.5 | 7.1 | 9.2 | 11.4 | 8.7 | 7.0 | 24.0 |
| Example 22 | FIGS. 6(a) to 6(d) | 4.45 | 0.92 | 2.88 | 2.0 | 3.5 | 7.1 | 9.2 | 11.4 | 8.7 | — | — |
| Example 23 | FIGS. 6(a) to 6(d) | 6.00 | 1.23 | 4.37 | 2.4 | 4.1 | 8.0 | 10.0 | 11.8 | 8.5 | 6.1 | 17.7 |
| Example 24 | FIGS. 6(a) to 6(d) | 6.00 | 1.23 | 4.37 | 2.4 | 4.1 | 8.0 | 10.0 | 11.8 | 8.5 | — | — |
| Comparative Example 1 | FIGS. 6(a) to 6(d) | 6.50 | 1.32 | 4.90 | 2.6 | 4.7 | 8.6 | 10.7 | 12.4 | 8.2 | 5.5 | 16.6 |
| Comparative Example 2 | FIGS. 6(a) to 6(d) | 6.50 | 1.32 | 4.90 | 2.6 | 4.7 | 8.6 | 10.7 | 12.4 | 8.2 | — | — |

TABLE 2

|  | Cross-sectional shape | Aperture ratio ($\beta$) | Ratio of partition wall lengths ($\alpha$) | (20/9) $\alpha^2 + 1$ | Initial pressure loss (kPa) | Pressure loss (kPa) upon collection of particulates Ag/L | |
| --- | --- | --- | --- | --- | --- | --- | --- |
|  |  |  |  |  |  | A = 0.5 | A = 4.0 |
| Example 25 | FIGS. 12(a) and 12(b) | 2.54 | 0.56 | 1.71 | 1.8 | 3.2 | 6.8 |
| Example 26 | FIGS. 12(a) and 12(b) | 2.54 | 0.56 | 1.71 | 1.8 | 3.2 | 6.8 |
| Example 27 | FIGS. 12(a) and 12(b) | 3.00 | 0.71 | 2.11 | 1.9 | 3.4 | 7.0 |
| Example 28 | FIGS. 12(a) and 12(b) | 4.45 | 1.11 | 3.74 | 2.2 | 3.9 | 7.7 |
| Example 29 | FIGS. 12(a) and 12(b) | 4.45 | 1.11 | 3.74 | 2.2 | 3.9 | 7.7 |
| Example 30 | FIGS. 12(a) and 12(b) | 6.00 | 1.49 | 5.91 | 2.6 | 4.7 | 8.4 |
| Example 31 | FIGS. 12(a) and 12(b) | 6.00 | 1.49 | 5.91 | 2.6 | 4.7 | 8.4 |
| Comparative Example 3 | FIGS. 12(a) and 12(b) | 6.50 | 1.60 | 6.68 | 2.8 | 5.1 | 9.1 |
| Comparative Example 4 | FIGS. 12(a) and 12(b) | 6.50 | 1.60 | 6.68 | 2.8 | 5.1 | 9.1 |
| Example 32 | FIGS. 12(c) and 12(d) | 4.45 | 0.10 | 1.02 | 1.9 | 3.1 | 7.5 |
| Example 33 | FIGS. 12(c) and 12(d) | 4.45 | 0.10 | 1.02 | 1.9 | 3.1 | 7.5 |
| Example 34 | FIGS. 12(c) and 12(d) | 6.00 | 0.29 | 1.18 | 2.1 | 3.3 | 7.5 |
| Example 35 | FIGS. 12(c) and 12(d) | 6.00 | 0.29 | 1.18 | 2.1 | 3.3 | 7.5 |
| Comparative Example 5 | FIGS. 12(c) and 12(d) | 6.50 | 0.34 | 1.26 | 2.4 | 4.0 | 8.2 |
| Comparative Example 6 | FIGS. 12(c) and 12(d) | 6.50 | 0.34 | 1.26 | 2.4 | 4.0 | 8.2 |
| Example 36 | FIGS. 12(e) and 12(f) | 2.39 | 0.37 | 1.30 | 1.7 | 3.0 | 6.6 |
| Example 37 | FIGS. 12(e) and 12(f) | 2.54 | 0.56 | 1.69 | 1.8 | 3.1 | 6.7 |
| Example 38 | FIGS. 12(e) and 12(f) | 2.54 | 0.56 | 1.69 | 1.8 | 3.1 | 6.7 |
| Example 39 | FIGS. 12(e) and 12(f) | 3.00 | 0.67 | 1.99 | 1.9 | 3.4 | 6.8 |
| Example 40 | FIGS. 12(e) and 12(f) | 4.19 | 0.72 | 2.15 | 2.0 | 3.4 | 6.8 |
| Example 41 | FIGS. 12(e) and 12(f) | 4.45 | 0.93 | 2.91 | 2.1 | 3.7 | 7.3 |
| Example 42 | FIGS. 12(e) and 12(f) | 4.45 | 0.93 | 2.91 | 2.1 | 3.7 | 7.3 |
| Example 43 | FIGS. 12(e) and 12(f) | 6.00 | 1.11 | 3.74 | 2.4 | 4.0 | 7.8 |
| Example 44 | FIGS. 12(e) and 12(f) | 6.00 | 1.11 | 3.74 | 2.4 | 4.0 | 7.8 |
| Comparative Example 7 | FIGS. 12(e) and 12(f) | 6.50 | 1.16 | 3.98 | 2.5 | 4.5 | 8.2 |
| Comparative Example 8 | FIGS. 12(e) and 12(f) | 6.50 | 1.16 | 3.98 | 2.5 | 4.5 | 8.2 |

TABLE 2-continued

|  | Pressure loss (kPa) upon collection of particulates Ag/L | | Recovery limit value | Isostatic strength | Compression strength |
|---|---|---|---|---|---|
|  | A = 6.0 | A = 8.0 | (g/L) | (MPa) | (MPa) |
| Example 25 | 8.9 | 11.3 | 8.6 | 8.7 | 19.5 |
| Example 26 | 8.9 | 11.3 | 8.6 | — | — |
| Example 27 | 9.0 | 11.4 | 8.6 | 8.4 | 18.4 |
| Example 28 | 9.7 | 11.7 | 8.5 | 7.3 | 18.2 |
| Example 29 | 9.7 | 11.7 | 8.5 | — | — |
| Example 30 | 10.2 | 12.0 | 8.3 | 6.0 | 18.3 |
| Example 31 | 10.2 | 12.0 | 8.3 | — | — |
| Comparative Example 3 | 11.0 | 12.9 | 8.2 | 5.7 | 17.6 |
| Comparative Example 4 | 11.0 | 12.9 | 8.2 | — | — |
| Example 32 | 10.0 | 13.0 | 8.6 | 6.9 | 23.7 |
| Example 33 | 10.0 | 13.0 | 8.6 | — | — |
| Example 34 | 9.8 | 12.7 | 8.3 | 5.9 | 17.5 |
| Example 35 | 9.8 | 12.7 | 8.3 | — | — |
| Comparative Example 5 | 10.4 | 13.2 | 8.1 | 5.2 | 16.1 |
| Comparative Example 6 | 10.4 | 13.2 | 8.1 | — | — |
| Example 36 | 9.0 | 11.5 | 8.6 | 8.4 | 18.5 |
| Example 37 | 8.9 | 11.3 | 8.6 | 8.6 | 19.2 |
| Example 38 | 8.9 | 11.3 | 8.6 | — | — |
| Example 39 | 8.9 | 11.3 | 8.6 | 8.2 | 18.2 |
| Example 40 | 8.8 | 11.1 | 8.6 | 7.9 | 17.2 |
| Example 41 | 9.4 | 11.5 | 8.6 | 7.1 | 17.3 |
| Example 42 | 9.4 | 11.5 | 8.6 | — | — |
| Example 43 | 10.0 | 12.1 | 8.4 | 5.8 | 15.6 |
| Example 44 | 10.0 | 12.1 | 8.4 | — | — |
| Comparative Example 7 | 10.6 | 12.8 | 8.2 | 5.3 | 15.8 |
| Comparative Example 8 | 10.6 | 12.8 | 8.2 | — | — |

TABLE 3

|  | Cross-sectional shape | Aperture ratio ($\beta$) | Ratio of partition wall lengths ($\alpha$) | (20/9) $\alpha^2 + 1$ | Initial pressure loss (kPa) | Pressure loss (kPa) upon collection of particulates Ag/L | |
|---|---|---|---|---|---|---|---|
|  |  |  |  |  |  | A = 0.5 | A = 4.0 |
| Comparative Example 9 | FIG. 10 | 1.55 | 0.60 | 1.79 | 2.3 | 4.4 | 8.5 |
| Comparative Example 10 | FIG. 10 | 1.55 | 0.60 | 1.79 | 2.3 | 4.4 | 8.5 |
| Comparative Example 11 | FIG. 10 | 2.54 | 0.88 | 2.73 | 2.4 | 4.5 | 8.4 |
| Comparative Example 12 | FIG. 10 | 2.54 | 0.88 | 2.73 | 2.4 | 4.5 | 8.4 |
| Comparative Example 13 | FIG. 10 | 3.00 | 1.00 | 3.22 | 2.6 | 4.8 | 8.6 |
| Comparative Example 14 | FIG. 10 | 4.45 | 1.33 | 4.96 | 2.8 | 5.1 | 9.2 |
| Comparative Example 15 | FIG. 10 | 4.45 | 1.33 | 4.96 | 2.8 | 5.1 | 9.2 |
| Comparative Example 16 | FIG. 10 | 6.00 | 1.65 | 7.02 | 3.2 | 5.4 | 9.3 |
| Comparative Example 17 | FIG. 10 | 6.00 | 1.65 | 7.02 | 3.2 | 5.4 | 9.3 |
| Comparative Example 18 | FIG. 10 | 6.50 | 1.74 | 7.72 | 3.3 | 5.6 | 9.4 |
| Comparative Example 19 | FIG. 10 | 6.50 | 1.74 | 7.72 | 3.3 | 5.6 | 9.4 |
| Comparative Example 20 | FIG. 11(a) | 1.55 | 0.00 | 1.00 | 1.5 | 2.5 | 7.1 |
| Comparative Example 21 | FIG. 11(b) | 2.54 | 0.00 | 1.00 | 1.6 | 2.6 | 7.2 |
| Comparative Example 22 | FIG. 11(b) | 3.00 | 0.00 | 1.00 | 1.7 | 2.7 | 7.2 |

TABLE 3-continued

| | | | | | | | |
|---|---|---|---|---|---|---|---|
| Comparative Example 23 | FIG. 11(c) | 2.54 | 0.00 | 1.00 | 1.6 | 2.6 | 7.2 |
| Comparative Example 24 | FIG. 11(c) | 3.66 | 0.00 | 1.00 | 1.8 | 2.9 | 7.5 |
| Comparative Example 25 | FIG. 11(c) | 3.66 | 0.00 | 1.00 | 1.8 | 2.9 | 7.5 |
| Comparative Example 26 | FIG. 11(d) | 4.37 | 0.00 | 1.00 | 1.8 | 3.0 | 7.5 |
| Comparative Example 27 | FIG. 11(d) | 4.37 | 0.00 | 1.00 | 1.8 | 3.0 | 7.5 |
| Comparative Example 28 | FIG. 6(e) | 1.00 | 0.00 | 1.00 | 1.5 | 2.3 | 6.9 |
| Comparative Example 29 | FIG. 6(e) | 1.00 | 0.00 | 1.00 | 1.5 | 2.3 | 6.9 |
| Comparative Example 30 | FIG. 19 | 3.00 | — | — | 2.8 | 5.1 | 9.8 |
| Comparative Example 31 | FIG. 20 | 1.28 | 0.00 | 1.00 | 1.8 | 3.3 | 7.6 |
| Comparative Example 32 | FIG. 21 | 1.52 | 0.00 | 1.00 | 2.0 | 3.1 | 7.8 |
| Comparative Example 33 | FIG. 22 | 2.54 | 0.88 | 2.73 | 1.8 | 3.2 | 6.6 |
| Comparative Example 34 | FIGS. 6(a) to 6(d) | 1.50 | 0.20 | 1.09 | 1.6 | 2.4 | 6.8 |

| | Pressure loss (kPa) upon collection of particulates Ag/L | | Recovery limit value | Isostatic strength | Compression strength |
|---|---|---|---|---|---|
| | A = 6.0 | A = 8.0 | (g/L) | (MPa) | (MPa) |
| Comparative Example 9 | 10.9 | 13.1 | 7.7 | 6.7 | 27.6 |
| Comparative Example 10 | 10.9 | 13.1 | 7.7 | — | — |
| Comparative Example 11 | 10.5 | 12.4 | 7.6 | 6.8 | 26.5 |
| Comparative Example 12 | 10.5 | 12.4 | 7.6 | — | — |
| Comparative Example 13 | 10.7 | 12.5 | 7.6 | 6.6 | 25.3 |
| Comparative Example 14 | 11.4 | 13.3 | 7.6 | 6.4 | 23.4 |
| Comparative Example 15 | 11.4 | 13.3 | 7.6 | — | — |
| Comparative Example 16 | 11.4 | 13.3 | 7.4 | 5.4 | 17.2 |
| Comparative Example 17 | 11.4 | 13.3 | 7.4 | — | — |
| Comparative Example 18 | 11.4 | 13.2 | 7.3 | 4.9 | 16.3 |
| Comparative Example 19 | 11.4 | 13.2 | 7.3 | — | — |
| Comparative Example 20 | 10.4 | 13.9 | 7.9 | 6.5 | 17.9 |
| Comparative Example 21 | 10.5 | 14.0 | 7.8 | 6.6 | 17.7 |
| Comparative Example 22 | 10.4 | 13.8 | 7.8 | 6.0 | 17.2 |
| Comparative Example 23 | 10.5 | 14.0 | 7.8 | — | — |
| Comparative Example 24 | 10.4 | 13.7 | 7.7 | 5.6 | 17.0 |
| Comparative Example 25 | 10.4 | 13.7 | 7.7 | — | — |
| Comparative Example 26 | 10.4 | 13.8 | 7.6 | 5.2 | 16.6 |
| Comparative Example 27 | 10.4 | 13.8 | 7.6 | — | — |
| Comparative Example 28 | 10.3 | 14.0 | 7.8 | 6.8 | 16.0 |
| Comparative Example 29 | 10.3 | 14.0 | 7.8 | — | — |
| Comparative Example 30 | 13.2 | 17.1 | 7.8 | 6.2 | 20.5 |
| Comparative Example 31 | 11.5 | 15.7 | 8.3 | 5.8 | 23.5 |
| Comparative Example 32 | 12.2 | 16.0 | 7.7 | 5.5 | 20.3 |

TABLE 3-continued

|  |  |  |  |  |  |
|---|---|---|---|---|---|
| Comparative Example 33 | 8.9 | 11.2 | 7.9 | 5.7 | 23.3 |
| Comparative Example 34 | 9.4 | 11.8 | 8.4 | 6.2 | 17.6 |

Figure 17:
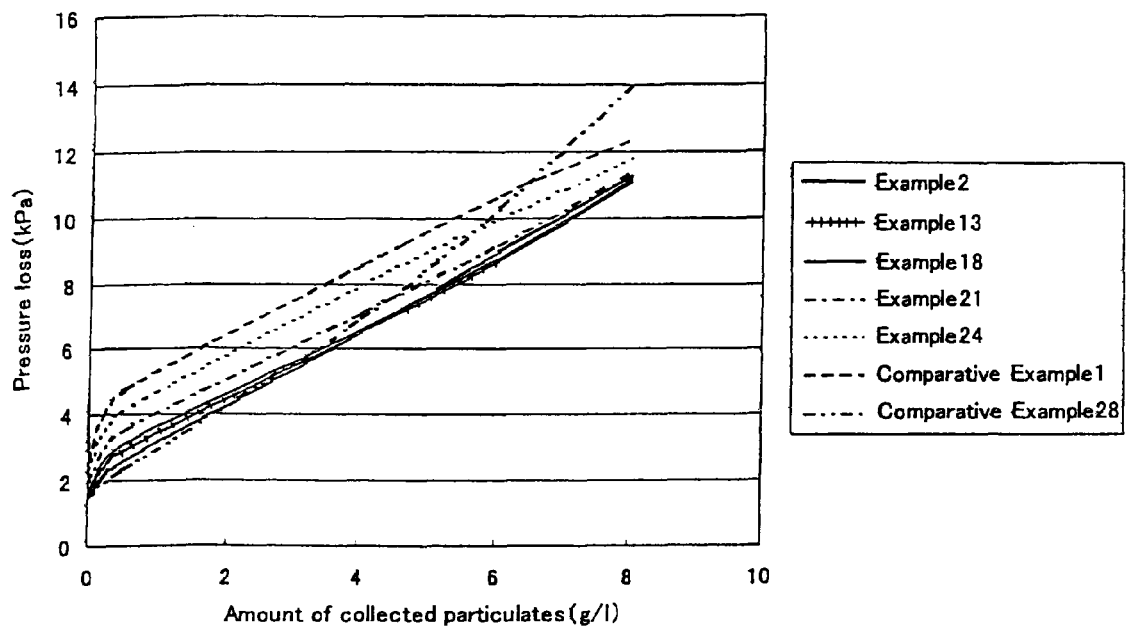
FIG. 17 is a graph that shows the relationship between a collected amount of particulates and a pressure loss in each of the filters according to examples and comparative examples.
Figure 17B:
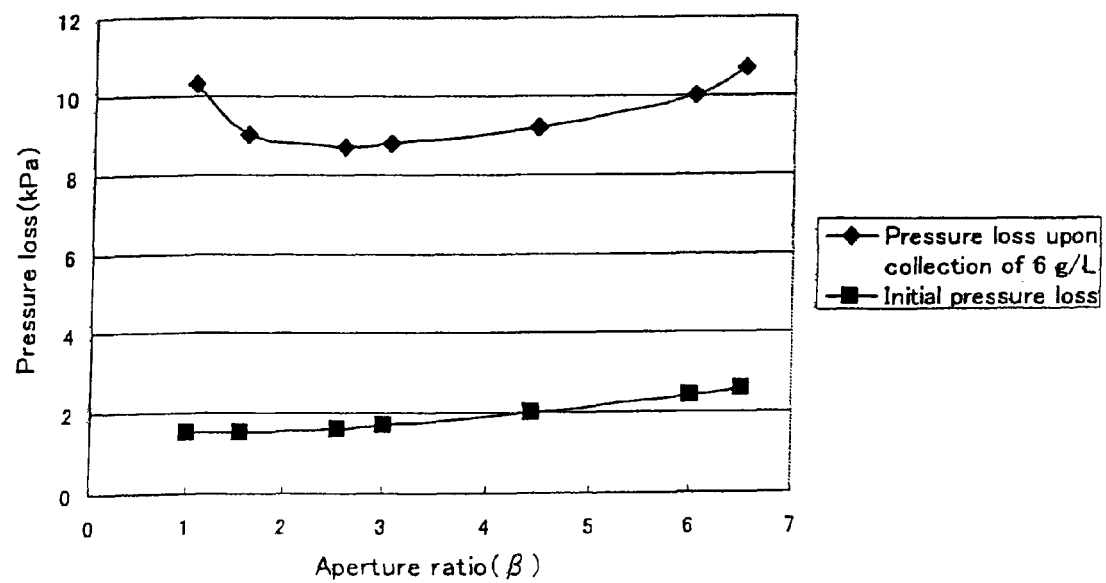
FIG. 17(b) is a graph that shows the relationship among β (aperture ratio), an initial pressure loss and a pressure loss after collection of 6 (g/L) of particulates, in each of filters according to the examples and the comparative examples.

As clearly indicated by the results shown in Tables 1 to 3 and FIG. 17, the filters according to the examples make it possible to reduce the pressure loss at the time of collection of a fixed amount of particulates in comparison with the filters according to comparative examples; therefore, it is possible to reduce the pressure loss from the viewpoint of the period up to recovery as a whole. Since the pressure loss is low, it is possible to collect a great amount of particulates.

Figure 15:
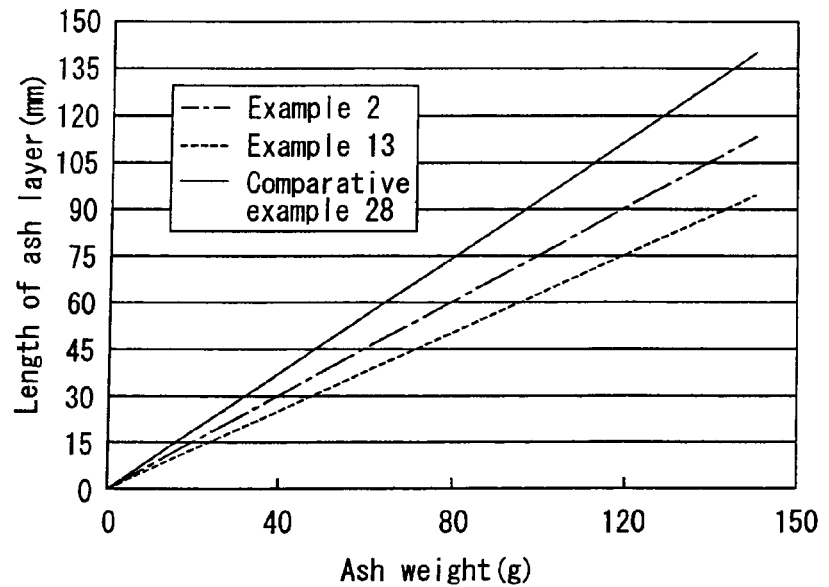
FIG. 15 is a graph that shows the relationship between the weight of ashes and the length of an ash layer in each of filters according to the examples and the comparative examples.
Figure 16:
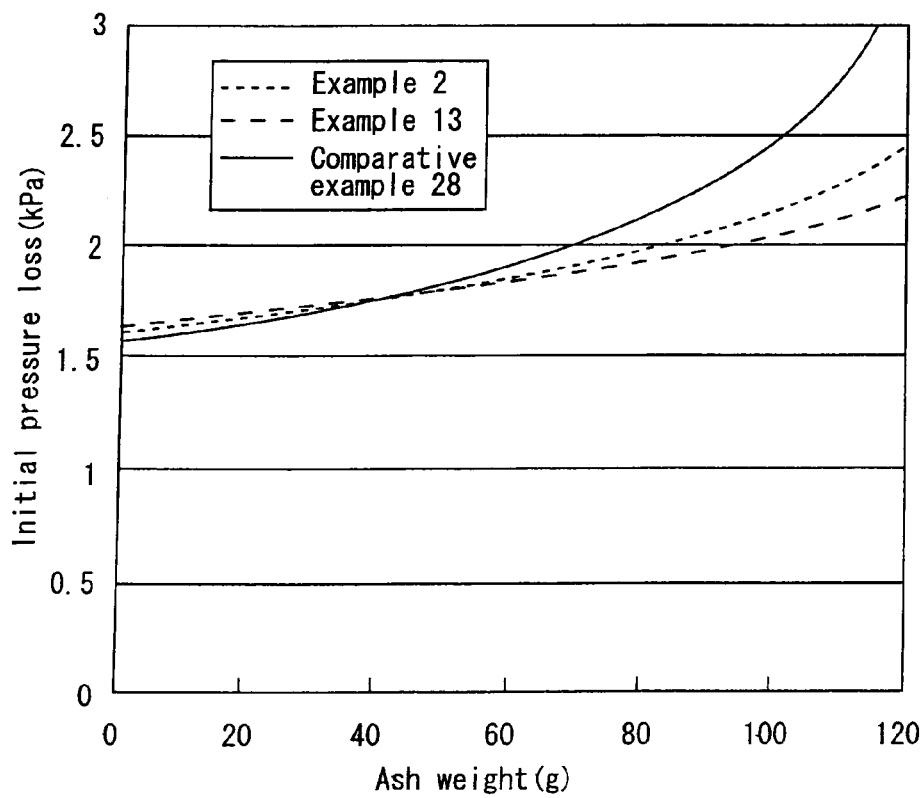
FIG. 16 is a graph that shows the relationship between the pressure loss and the ash weight in a state where no particulates are deposited on a filter before collection of particulates or immediately after a recovery process, in each of filters according to the examples and the comparative examples.

Moreover, as shown in FIGS. 15 and 16, in the case of the filters according to Examples 2 and 13, the length of the ash layer becomes shorter relative to the ash weight, in comparison with the filter according to Comparative Example 28, thus making it possible to reduce the pressure loss due to the ash layer, and consequently to lengthen the period up to the necessity of back wash and the like. In comparison with the filters according to comparative examples, since the recovery limit value in the filters according to examples is greater, it becomes possible to collect a greater amount of particulates until the recovery, and consequently to lengthen the period up to the recovery.

Figure 6:
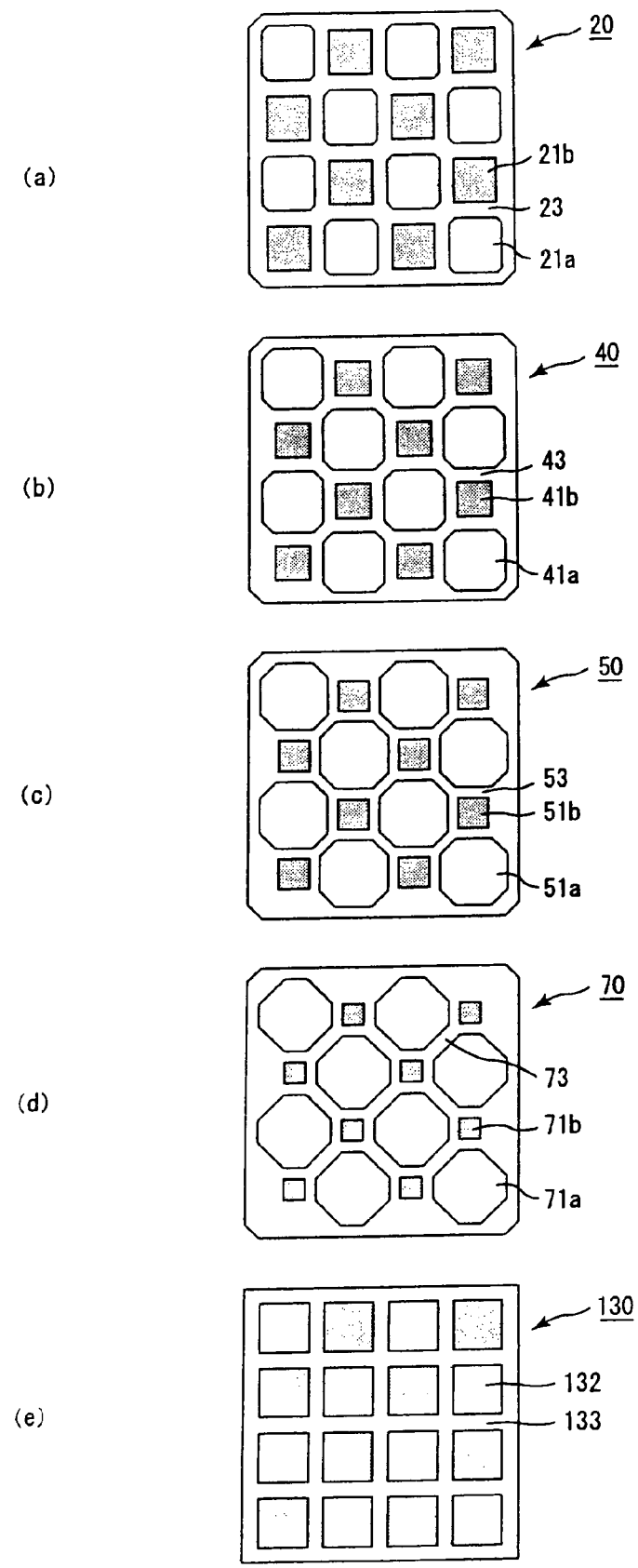
FIGS. 6(a) to 6(d) are cross-sectional views each of which schematically shows a cross section perpendicular to the length direction of a porous ceramics member forming the filter of the present invention.
FIG. 6(e) is a cross-sectional view that schematically shows a cross section perpendicular to the length direction of a porous ceramics member that forms a conventional filter.
Figure 18:
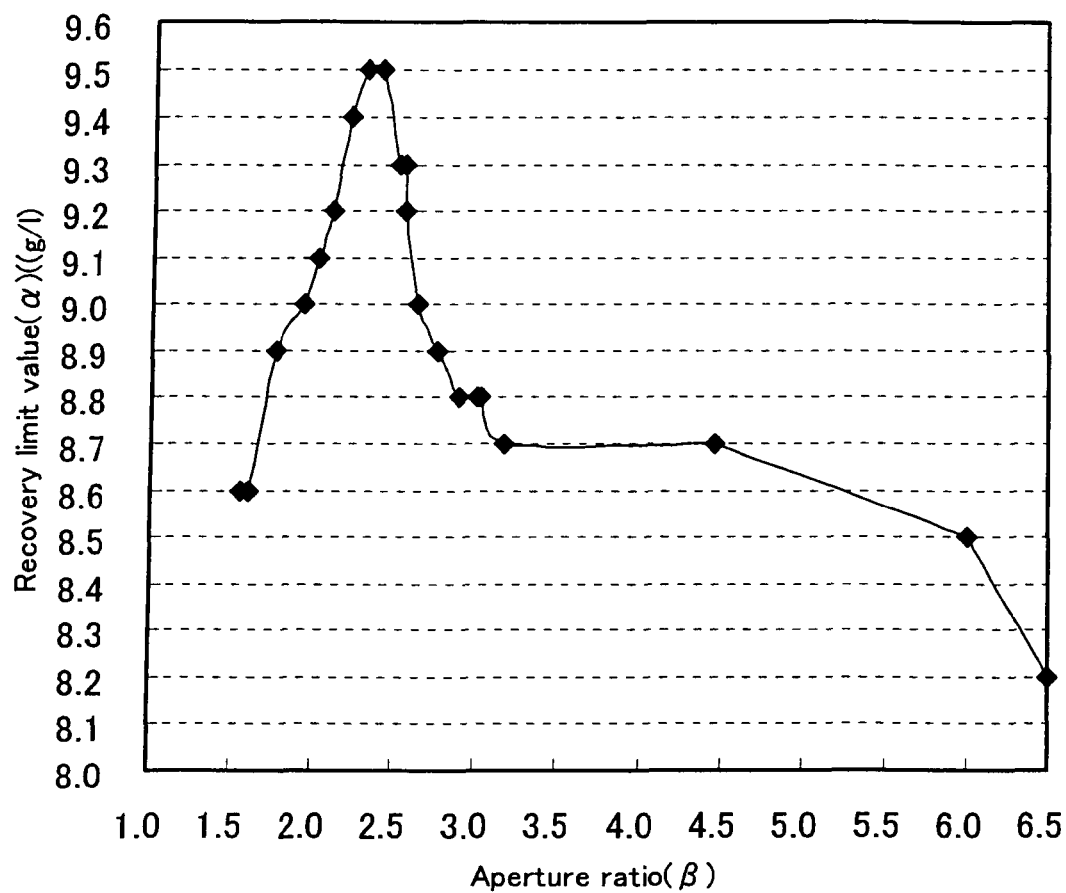
FIG. 18 is a graph that shows the relationship between β (aperture ratio) and a recovery limit value in each of filters according to the examples.

Moreover, as shown in FIG. 18, in the case of filters having cross-sectional shapes shown in FIGS. 6(*a*) to 6(*d*), the recovery limit value becomes greatest in the vicinity of 2.3 to 2.4 in the value of β (aperture ratio). Therefore, when the results obtained from Examples 1 to 44 and Comparative Examples 1 to 33 are taken into consideration, β is preferably set in a range from 1.55 to 2.75, more preferably from 2.0 to 2.54.

INDUSTRIAL APPLICABILITY

The filter of the present invention makes it possible to suppress the initial pressure loss and, also, to reduce the rising rate of the pressure loss that increases as particulates accumulate; therefore, the pressure loss at the time when a prescribed amount of particulates have been collected becomes lower, and the pressure loss from the viewpoint of the period up to the recovery as a whole also becomes lower. In fact, the recovery limit value, which indicates the maximum value of the amount of collection up to the recovery, is made greater in comparison with comparative examples. Therefore, a great amount of particulates can be collected up to the recovery, making it possible to lengthen the period up to the recovery. Moreover, the length of the ash layer is made shorter relative to the ash weight, and the pressure loss caused by the ash layer is also made smaller, so that it is possible to lengthen the period until the back wash and the like becomes necessary.

The invention claimed is:

1. A filter comprising:
a honeycomb structural body having a plurality of through holes extending parallel with one another in a length direction of the honeycomb structural body, the honeycomb structural body having a wall portion interposed between the through holes; and
a sealing material layer formed on a circumference of the honeycomb structural body,
wherein said plurality of through holes includes a plurality of large-capacity through holes and a plurality of small-capacity through holes, said large-capacity through holes and said small-capacity through holes being substantially same in numbers, said large-capacity through holes are sealed at one end of said honeycomb structural body, said small-capacity through holes are sealed at the other end of said honeycomb structural body, said large-capacity through holes and said small-capacity through holes have a ratio of partition wall length, α, and an aperture ratio, β, and said α and said β satisfy $0<\alpha\leq 1.5$, $2\leq\beta\leq 2.75$, and $\beta\geq(20/9)\alpha^2+1$.

2. The filter according to claim 1, wherein the large-capacity through holes have a total cross-section area which is larger than a total cross-section area of the small-capacity through holes.

3. The filter according to claim 1, wherein the large-capacity through holes have an octagonal shape in a cross-section perpendicular to the length direction and the small-capacity through holes have a quadrangle or square shape in the cross-section.

4. The filter according to claim 1, wherein the large-capacity through holes and small-capacity through holes are alternately formed in the honeycomb structural body.

5. The filter according to claim 1, wherein at least one of the plurality of large-capacity through holes and the plurality of small-capacity through holes has a polygonal shape in a cross section perpendicular to the length direction.

6. The filter according to claim 1, wherein at least one of the plurality of large-capacity through holes and the plurality of small-capacity through holes has one of an octagonal shape, a quadrangle shape and a square shape in a cross section perpendicular to the length direction.

7. The filter according to claim 1, wherein in the cross-section, at least one angle formed at a point where a first wall portion, which is shared by a large-capacity through hole and an adjacent large capacity through hole, intersects a second wall portion, which is shared by a large-capacity through hole and an adjacent small-capacity through hole, is an obtuse angle.

8. The filter according to claim 1, wherein in said cross-section, at least one of the plurality of large-capacity through holes and the plurality of small-capacity through holes has chamfered corner portions.

9. The filter according to claim 1, wherein a distance between centers of gravity in the cross-section of nearest ones of the large-capacity through holes is same as a distance between centers of gravity in the cross-section of nearest ones of the small-capacity through holes.

10. The filter according to claim 1, having an isostatic strength of 7 MPa or more.

11. The filter according to claim 1, having a compression strength of A-axis of 18 MPa or more.

12. The filter according to claim 1, which is configured to be an exhaust gas purifying apparatus in a vehicle.

13. A filter comprising:
a plurality of porous ceramic members each having a plurality of through holes extending parallel with one another in a length direction of the porous ceramic members, each of the porous ceramic members having a wall portion interposed between the through holes; and a first sealing material layer formed on a circumference of the plurality of porous ceramic members, wherein said plurality of through holes includes a plurality of large-capacity through holes and a plurality of small-capacity through holes, said large-capacity through holes and said small-capacity through holes being substantially same in numbers, said large-capacity through holes are sealed at one end of said porous ceramic members, said small-capacity through holes are sealed at the other end of said porous ceramic members, said large-capacity through holes and said small-capacity through holes have a ratio of partition wall length, $\alpha$, and an aperture ratio, $\beta$, and said $\alpha$ and said $\beta$ satisfy $0<\alpha\leq1.5$, $2\leq\beta\leq2.75$, and $\beta\geq(20/9)\alpha^2+1$.

14. The filter according to claim 13, wherein the plurality of porous ceramic members are combined with one another with a second sealing material.

15. The filter according to claim 13, wherein the large-capacity through holes have a total cross-section area which is larger than a total cross-section area of the small-capacity through holes.

16. The filter according to claim 13, wherein the large-capacity through holes have an octagonal shape in a cross-section perpendicular to the length direction and the small-capacity through holes have a quadrangle or square shape in the cross-section.

17. The filter according to claim 13, wherein the large-capacity through holes and small-capacity through holes are alternately formed in each of the porous ceramic members.

18. The filter according to claim 13, wherein at least one of the plurality of large-capacity through holes and the plurality of small-capacity through holes has a polygonal shape in a cross section perpendicular to the length direction.

19. The filter according to claim 13, wherein at least one of the plurality of large-capacity through holes and the plurality of small-capacity through holes has one of an octagonal shape, a quadrangle shape and a square shape in a cross section perpendicular to the length direction.

20. The filter according to claim 13, wherein in the cross-section, at least one angle formed at the point where a first wall portion, which is shared by a large-capacity through hole and an adjacent large-capacity through hole, intersects a second wall portion, which is shared by a large-capacity through hole and an adjacent small-capacity through hole, is an obtuse angle.

21. The filter according to claim 13, wherein in said cross-section, at least one of the plurality of large-capacity through holes and the plurality of small-capacity through holes has chamfered corner portions.

22. The filter according to claim 13, wherein a distance between centers of gravity in the cross-section of nearest ones of the large-capacity through holes is same as a distance between centers of gravity in the cross-section of nearest ones of the small-capacity through holes.

23. The filter according to claim 13, having an isostatic strength of 7 MPa or more.

24. The filter according to claim 13, having a compression strength of A-axis of 18 MPa or more.

25. The filter according to claim 13, which is configured to be an exhaust gas purifying apparatus in a vehicle.

* * * * *

UNITED STATES PATENT AND TRADEMARK OFFICE
CERTIFICATE OF CORRECTION

PATENT NO. : 7,857,885 B2
APPLICATION NO. : 11/760833
DATED : December 28, 2010
INVENTOR(S) : Sungtae Hong et al.

Page 1 of 1

It is certified that error appears in the above-identified patent and that said Letters Patent is hereby corrected as shown below:

On the title page, Item (63), the Related U.S. Application Data information is incorrect. Item (63) should read:

-- Related U.S. Application Data

(63) Continuation of application No. 10/490,206, filed on Sep. 2, 2004 which is a 371 of PCT/JP03/11776 on Sep. 16, 2003, now Pat. No. 7,326,270. --

On the title page, Item (30), the Foreign Application Priority Data has been omitted. Item (30) should read:

-- (30) Foreign Application Priority Data

Sep. 13, 2002 (JP) ..............................2002-267819

Mar. 4, 2003 (JP) ...........................2003-057631 --

Signed and Sealed this
Fifteenth Day of March, 2011

David J. Kappos
*Director of the United States Patent and Trademark Office*